US010028213B2

(12) United States Patent
Colban et al.

(10) Patent No.: US 10,028,213 B2
(45) Date of Patent: Jul. 17, 2018

(54) NETWORK SELECTION RECOMMENDER SYSTEM AND METHOD

(71) Applicant: Taiwan Semiconductor Manufacturing Co., Ltd., Hsinchu (TW)

(72) Inventors: Erik Colban, San Diego, CA (US); David Gell, San Diego, CA (US)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 392 days.

(21) Appl. No.: 14/539,942

(22) Filed: Nov. 12, 2014

(65) Prior Publication Data

US 2015/0319677 A1 Nov. 5, 2015

Related U.S. Application Data

(60) Provisional application No. 61/903,386, filed on Nov. 12, 2013.

(51) Int. Cl.
*H04W 4/00* (2018.01)
*H04W 48/20* (2009.01)
(Continued)

(52) U.S. Cl.
CPC .......... *H04W 48/20* (2013.01); *H04W 24/08* (2013.01); *H04W 48/14* (2013.01); *H04W 48/16* (2013.01);
(Continued)

(58) Field of Classification Search
CPC ..... H04W 48/20; H04W 48/18; H04W 48/04; H04W 4/027; H04W 48/14; H04W 48/16;
(Continued)

(56) References Cited

U.S. PATENT DOCUMENTS

| 5,396,647 A | 3/1995 | Thompson |
| 2004/0246922 A1* | 12/2004 | Ruan ..................... H04W 48/20 |
| | | 370/331 |

(Continued)

FOREIGN PATENT DOCUMENTS

| EP | 1519615 | 3/2005 |
| EP | 1863313 | 12/2007 |
| WO | 20070010319 | 1/2007 |

OTHER PUBLICATIONS

Ramona Trestian, et al., "Game Theory-Based Network Selection: Solutions and Challenges", IEEE Communications Surveys, IEEE, New York, NY, US, vol. 14, No. 4, Oct. 1, 2012, pp. 1212-1231.

(Continued)

*Primary Examiner* — Noel R Beharry
*Assistant Examiner* — Lionel Preval
(74) *Attorney, Agent, or Firm* — JCIPRNET

(57) ABSTRACT

A method, wireless device and computer program product determine a recommended access point (AP) for the wireless device to access a wireless network. AP feature values associated with each one of a plurality of APs within an access range of the wireless device and user feature values associated with identified user features of a user of the wireless device are obtained via a wireless interface. A predicted score for each AP is determined based on the feature values and a recommended AP is determined based on the predicted scores. The wireless device connects to the wireless network based at least in part on the recommended AP. AP feature values include AP characteristic, scheduling and payment values. User features include wireless device location and velocity, services-in-use, time of day and day of week. Optionally, circumstantial feature values may be obtained and used to determine the predicted scores.

39 Claims, 10 Drawing Sheets

(51) Int. Cl.
    *H04W 48/14*     (2009.01)
    *H04W 24/08*     (2009.01)
    *H04W 48/16*     (2009.01)
    *H04W 48/00*     (2009.01)
    *H04W 48/18*     (2009.01)
    *H04W 84/12*     (2009.01)

(52) U.S. Cl.
    CPC ........... *H04W 48/17* (2013.01); *H04W 48/18* (2013.01); *H04W 84/12* (2013.01)

(58) Field of Classification Search
    CPC ..... H04W 48/17; H04W 24/08; H04W 84/12; H04L 12/5692; H04L 67/30
    USPC ................................. 370/338, 331; 455/434
    See application file for complete search history.

(56) References Cited

U.S. PATENT DOCUMENTS

| | | | |
|---|---|---|---|
| 2005/0094609 A1* | 5/2005 | Tandai | H04W 48/16 370/338 |
| 2007/0249291 A1 | 10/2007 | Nanda | |
| 2012/0076117 A1* | 3/2012 | Montemurro | H04W 48/16 370/338 |
| 2013/0115945 A1* | 5/2013 | Holostov | H04W 4/02 455/434 |

OTHER PUBLICATIONS

International Search Report dated Apr. 22, 2015, issued for International Application No. PCT/US2014/065325.

\* cited by examiner

NETWORK SELECTION RECOMMENDER SYSTEM AND METHOD

RELATED APPLICATIONS

This patent application claims priority from U.S. Provisional Patent Application No. 61/903,386, filed Nov. 12, 2013, entitled "Network Selection Recommender System," the entirety of which is incorporated herein by reference.

BACKGROUND OF THE INVENTION

Field of Invention

The present invention relates to a wireless network access system and more particularly to a system and method for discovering and selecting an appropriate access point (AP) for wireless network access.

Description of the Related Art

A technology for wireless network access that is widely deployed is the Institute of Electrical and Electronics Engineers (IEEE) Standard 802.11, often referred to as WI-FI (WI-FI® is a registered trademark of the Wi-Fi Alliance). The AP is usually connected to a backbone network through which a wireless device may access a larger network such as the Internet or a service provider's network.

Many users carry devices that are enabled for WI-FI communication. These user devices are sometimes called user equipment (UE). Almost all laptop computers, notebooks, tablets, smart phones, etc., that are sold today are WI-FI enabled. Some of these devices may also be enabled for wireless communication over a cellular network, such as Global System for Mobile Communication (GSM), Third Generation Partnership Project (3GPP) protocols, Universal Mobile Telecommunications System (UMTS), or 3GPP Long Term Evolution (LTE) in addition to WI-FI communication.

With the proliferation of APs, the users (i.e. the UEs) are faced with the problem of determining and selecting APs that are appropriate for their desired use. Although the term "access point" or "AP," is commonly used in connection with WI-FI, the term is used herein to represent points of access to a wireless network via WI-FI, cellular communication protocols or other communication protocols. Not all APs provide access to the Internet, and therefore, depending on what a user wishes to do, some APs may not be appropriate. Some APs may provide access only to users with a subscription, or may require payment by a credit card. Some APs provide access to a limited set of services, or provide limited bitrates not sufficient for certain services, such as a video or online games.

Rogue APs, which are APs that may be used for scams or other criminal activities, also pose a problem. Users may be fooled to believe that they are accessing an AP operated by a trusted party and provide access credentials (e.g., passwords), credit card payment information, and/or exchange other confidential information, all of which may be monitored by someone who may later misuse the information.

The access procedure for a UE to access an AP, when performed manually, involves several steps, such as selecting the AP (sometimes there are a large number of APs within reach), entering user credentials, entering credit card information, etc., all of which is time consuming, tedious, and vulnerable to security threats. In summary, the AP selection may easily lead to user frustration.

The problem of discovering and selecting APs has been addressed by several organizations. The 802.11 standard specifies beacon frames and probe request and response frames, which provides some information about the AP to the UE. Amendment IEEE 802.11u introduces the Generic Advertisement Service (GAS) and the Access Network Query Protocol (ANQP). GAS allows the UE to discover the availability of information related to desired network services. ANQP is a query and response protocol that uses GAS and is used by the UE to discover information, such as the service provider's domain name, roaming partners accessible via the AP and the method used for authentication. The queries can be made before association, which means that they can be performed before the authentication procedure. The Wi-Fi Alliance Hotspot 2.0 Specification provides extensions to queries specified in 802.11u. Provided that both the AP and the UE are properly configured, the discovery and selection procedure can be almost transparent to the user.

The mobile cellular network operators (e.g., operators of networks compliant with the 3GPP specifications) are deploying APs using WI-FI technology to address the ever increasing demand for bandwidth. The interworking between 3GPP and Wireless Local Access Networks (WLAN) is specified in 3GPP TS 23.402. Currently, 3GPP is developing TR 23.865, which addresses WLAN network selection. That report specifies enhancements to the Access Network Discovery and Selection Function (ANDSF). The ANDSF server may send Managed Objects (MO) (specified in TS 24.312) to the mobile device specifying policies for AP selection. Such policies may include: preferred roaming partner list, a minimum backhaul capability threshold, service provider exclusion list, etc.

Although the work that is being carried out by IEEE, the Wi-Fi Alliance, and 3GPP in regards to network discovery and selection may simplify the process of selecting an AP, even, in some cases, making the selection procedure completely transparent to the user, there are still problems to be addressed.

First, not all APs are enabled with the GAS/ANQP features, or they are managed by a service provider that does not support ANDSF or Hotspot 2.0. These APs include the user's home AP and one or several APs at the user's office or work place. The AP selection policies deployed by the user's wireless cellular service provider via an ANDSF MO may not cover these APs.

Second, access is often offered for free or for a fee through APs installed in hotels, airports and airport lounges, train and bus stations, in trains, airplanes, taxis and on buses, restaurants and cafés, etc. These APs may provide full Internet access, or access only to a limited set of services (e.g., only to the airport portal) and/or services that are not accessible from the Internet but only accessible on a local area network (e.g., access to a printer at an airport frequent flier lounge). Although some of these APs may support GAS/ANQP and allow the user to query for available services, these APs may not fall under the WLAN selection policies deployed by any deployed ANDSF MO.

Third, a user's preferences may not be known or configurable by the service provider. A user's preferences may depend on, e.g., what service the user wants to invoke, whether the user is moving, is indoors or outdoors, etc. The ANDSF MOs, on the other hand, are primarily intended to direct the user toward APs owned or managed by the service provider or by its roaming partners and to keep the user from accessing APs that are heavily loaded, among other things. The ANDSF MOs do not capture the user's preferences, which may vary among users and over time.

In summary, solutions are being developed that enhance the information that may be used to make a network selection decision, and procedures and protocols are also being established to improve the ease of making a connection; however, there remains the problem of how to actually decide which network is most suitable to join.

BRIEF SUMMARY OF THE INVENTION

Embodiments of the present invention address deficiencies of the art in respect to limitations in wireless network access and provide a novel and non-obvious method, system, devices and computer program product for discovering and selecting an appropriate access point (AP) for wireless network access.

In accordance with one aspect of the present invention, a method, wireless device and computer program product determine a recommended access point for the wireless device to access a wireless network. The wireless device includes a wireless interface. Access point feature values associated with each one of a plurality of access points within an access range of the wireless device are obtained via the wireless interface. User feature values associated with identified user features of a user of the wireless device are also obtained. A predicted score for each access point of the plurality of access points is determined based on at least one of the obtained access point feature values and the obtained user feature values. A recommended access point of the plurality of access points is determined based on the predicted scores associated with the plurality of access points. The wireless device connects to the wireless network based, at least in part, on the recommended access point.

In accordance with another aspect of the present invention, the access point feature values comprise at least one of: an access point characteristic value, a scheduling value, and a payment value. The access point characteristic value is at least one of the group comprising: an access point distance value, an access point distance differential value, an access point environment value, a coverage area radius value, a services offered value, a throughput value, a backhaul bandwidth value, an air interface channel utilization value, a round trip delay value, a packet data network reachability value, a direct internet access value, a local area network access value, a 3GPP-trusted value, a security value, a mobility support value, a closed subscriber group value, a signal strength value, a noise and interference value, a signal to noise and interference ratio value, an air interface technology value and an operator policies value.

In accordance with another aspect of the present invention, the identified user features are one or more of the group comprising: a wireless device location, a wireless device velocity, a services-in-use, a time of day and a day of week.

In accordance with yet another aspect of the present invention, circumstantial feature values are obtained and the predicted score for each access point is further based on at least one of the obtained circumstantial feature values.

In accordance with one aspect, the predicted score for each access point is determined based on a sum of each feature value multiplied by a weighting factor associated with a particular user of the wireless device.

In accordance with another aspect, the predicted score for each access point is determined based on a sum of products of each access point feature value multiplied by a weighting factor, and wherein each weighting factor is a function of the user feature values. The weighting factor may be a linear function of the user feature values.

In accordance with still another aspect of the present invention, the user of the wireless device is represented as a combination of two or more partial users, and the predicted score is determined by determining a partial predicted score for each partial user based on at least one of the obtained access point feature values, determining a coefficient associated with each partial user based on at least one of the obtained user feature values, multiplying the partial predicted score by the corresponding coefficient for each partial user to obtain a predicted score product for each partial user, and summing all of the predicted score products to determine the predicted score.

In accordance with another aspect, the determining a predicted score for each access point is conducted by applying a model to the at least one of the obtained access point feature values and the at least one of the obtained user feature values. The model may be derived using collaborative filtering or received via the wireless interface.

In accordance with yet another aspect, a user satisfaction score associated with at least one access point of the plurality of access points is derived. A sample for the at least one access point of the plurality of access points is generated based on the user satisfaction score and one or more of at least one of the obtained access point feature values and at least one of the obtained user feature values, and the sample for the at least one access point of the plurality of access points is stored. The user satisfaction score may be derived using at least one of: a user experience metric associated with the at least one access point, a user access point preference setting, a user manual selection and a user-indicated satisfaction indication. The user experience metric associated with the at least one access point is one or more of: a packet retransmissions indication, a download speed indication, a received signal strength indication, a frequency of playback buffer underflows indication, a dropped calls indication, a connection time indication, and a frequency of returns to respective access point. The user access point preference indication may be one or more of a preferred access point identification and a bookmarked access point indication.

In accordance with another aspect of the present invention, a model is generated based on the derived samples corresponding to the at least one of the plurality of access points. The model may be associated with a particular user and generated based on the derived samples corresponding to the particular user. The model may also be based on collaborative filtering, and the derived samples correspond to a plurality of users. Further, all of the obtained access point feature values and the obtained user feature values may be normalized.

In accordance with still another aspect of the present invention, the model is trained to determine feature weighting factors by minimizing a cost function.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The details of the present invention, both as to its structure and operation, may be gleaned in part by study of the accompanying drawings, in which like reference numerals refer to like parts, and in which.

DETAILED DESCRIPTION OF THE INVENTION

An embodiment of the disclosure provides for a system, a wireless device, a network device and a method of discovering and selecting an appropriate access point (AP) for wireless network access. The descriptions and features disclosed herein can be applied to various wireless communication systems. Such communication systems may be capacity-limited. For example, the features disclosed herein can be used with Cellular 2G, 3G, 4G (including Long Term Evolution (LTE), LTE Advanced, and WiMAX), cellular backhaul, WI-FI, Ultra Mobile Broadband (UMB), cable modem, and other point-to-point or point-to-multipoint wireline or wireless technologies. For concise exposition, various aspects are described using terminology and organization of particular technologies and standards. However, the features described herein are broadly applicable to other technologies and standards.

Depending on context, the user device is sometimes called User Equipment (UE) (in particular within the 3GPP specifications), mobile station (MS) or station (STA) (in particular in the IEEE 802 standards), subscriber station, user device, mobile device, wireless device, smart phone, personal digital assistant (PDA), etc. In the following, the term UE is used to mean any of the above. Although the concept of an AP is commonly used in reference to WI-FI, depending on context, the AP is sometimes called Base Station (BS) (in particular in IEEE 802.16 standards and Third Generation Partnership Project 2 (3GPP2) specifications), access node, NodeB (NB), enhanced NodeB (eNB), or Home NB (HNB) or Home eNB, (collectively abbreviated H(e)NB) (in 3GPP specifications).

Although the example of a recommender system described herein is primarily used to recommend and select a preferred WI-FI AP, the system can be generalized to recommend and select an access node based on a different communications technology. In particular, the recommender system can be used to select one access node among several nodes where some may be based on a 3GPP-based technology (LTE or UTRA), CDMA2000, or other cellular mobile network technology and others may be based on WI-FI.

Figure 1:
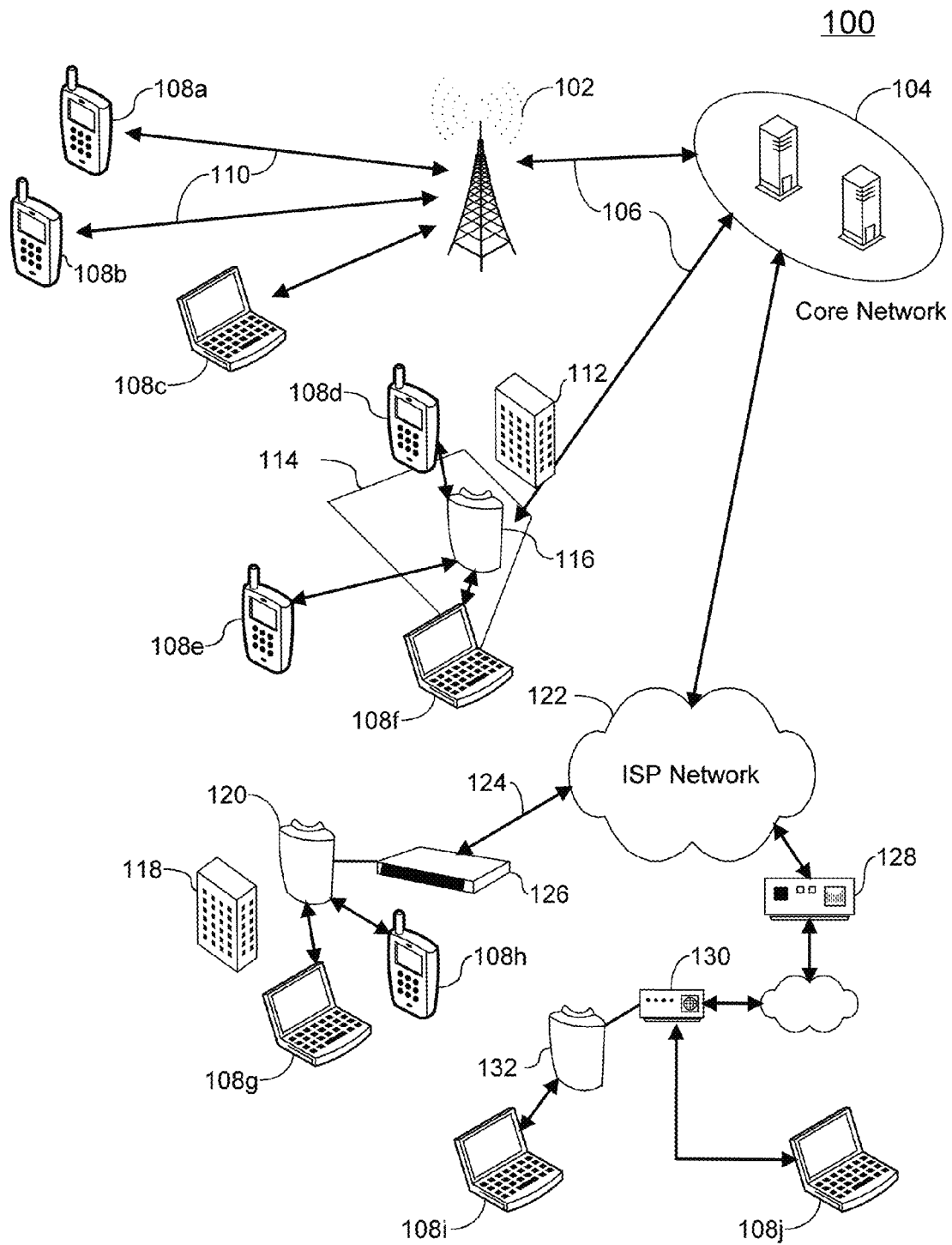
FIG. 1 is a diagram of a network system in which aspects of the invention may be implemented.

FIG. 1 is a block diagram of a communication network 100 in which features disclosed herein can be implemented in accordance with aspects of the disclosure. A macro base station 102 is connected to a core network 104 through a backhaul connection 106. In an embodiment, the backhaul connection 106 is a bidirectional link or two unidirectional links. The direction from the core network 104 to the macro base station 102 is referred to as the downstream or downlink (DL) direction. The direction from the macro base station 102 to the core network 104 is referred to as the upstream or uplink (UL) direction. A plurality of UEs 108a, 108b, 108c, 108d, 108e, 108f, 108g, 108h, 108i, and 108j (referenced collectively, or generally, herein, as UE 108) is shown. UE 108a, 108b and 108c can connect to the core network 104 through the macro base station 102. Wireless links 110 between UE 108a, 108b and 108c and the macro base station 102 are bidirectional point-to-multipoint links, in an embodiment. The direction of the wireless links 110 from the macro base station 102 to the UE 108a, 108b and 108c is referred to as the downlink or downstream direction. The direction of the wireless links 110 from the UE 108a, 108b and 108c to the macro base station 102 is referred to as the uplink or upstream direction. The UE 108a, 108b and 108c access content over the wireless links 110 using base stations, such as the macro base station 102, as a bridge. That is to say, the base stations generally pass user application data and any user application control messages between the UE 108a, 108b and 108c and the core network 104 without the base station being a destination for the data and control messages or a source of the data and control messages.

In the network configuration illustrated in FIG. 1, an office building 112 causes a coverage shadow 114. A pico station 116 can provide coverage to UE 108d, 108e and 108f in the coverage shadow 114. The pico station 116 is connected to the core network 104 via a backhaul connection 106. The UE 108d, 108e and 108f may be connected to the pico station 116 via links that are similar to or the same as the wireless links 110 between the UE 108a, 108b and 108c and the macro base station 102.

In office building 118, an enterprise femtocell 120 provides in-building coverage to UE 108g and 108h. The enterprise femtocell 120 can connect to the core network 104 via an Internet Service Provider (ISP) network 122 by utilizing a broadband connection 124 provided by an enterprise gateway 126.

In addition, ISP network 122 may also provide a broadband connection between core network 104 and cable head end 128, which may be a cable head end of a local, regional or national digital cable service. Cable head end 128 is connected to a large number of set top boxes and cable modems, such as cable modem 130, by a network of cables or other wired connections. Cable modem 130 may be provided in a residence or a business location and is seen in FIG. 1 to provide internet connectivity to UE 108i and 108j. In this regard, cable modem 130 in FIG. 1 is connected to AP 132 which provides wireless coverage to UE 108*i* via a WI-FI (802.11) wireless connection. UE 108*j* is shown in FIG. 1 as being directly wired to cable modem 130 via an Ethernet connection or other wired connection.

It should be noted that one or more of the subscriber stations (i.e. UEs) depicted in FIG. 1 may be within the coverage area of one or more base stations (i.e. APs), and therefore have the choice of deciding which base station to connect with. The decision of which base station a subscriber station will connect with may depend on many factors, which may include the type of wireless technology that is supported by each particular base station (AP). For example referring to FIG. 1, UE 108*d* may be within the coverage area of both pico station 116 and base station 102, and therefore would need to decide which one to connect with. Similarly, UE 108*f* may be within the coverage area of base station 102, pico station 116, femtocell 130 and WI-FI AP 132, and therefore would need to decide which AP to connect with.

Figure 2:
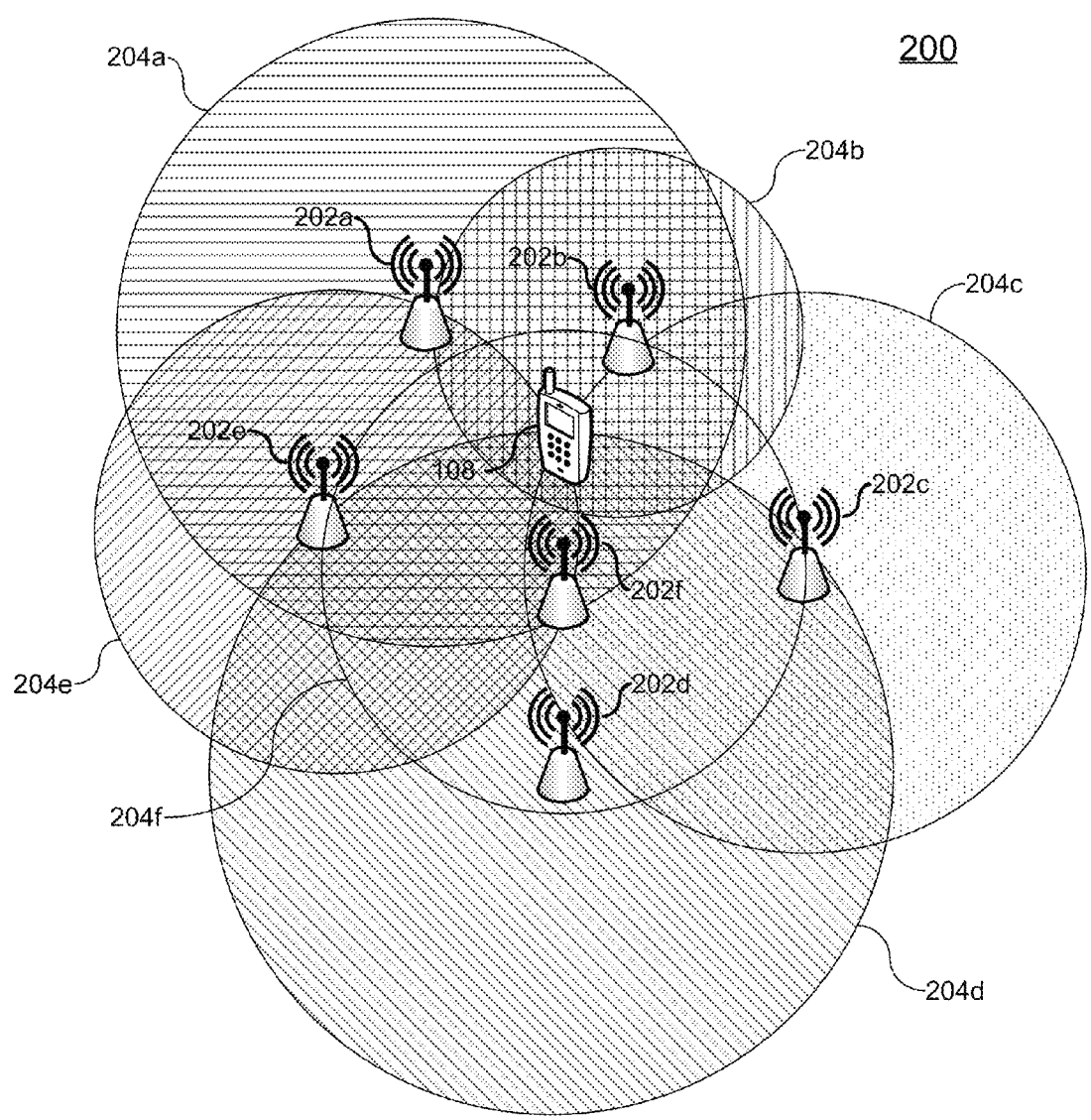
FIG. 2 is a diagram of a coverage map for a network system in which multiple APs are present for selection.

Referring now to FIG. 2, a coverage map of wireless network system 200 is provided. UE 108 is within range of a plurality of APs (six shown) 202*a*, 202*b*, 202*c*, 202*d*, 202*e* and 202*f* (referenced collectively, or generally, herein, as AP 202). Each AP 202 may provide access to the Internet, a local area network or a wide area network. Some of the APs 202 may provide access to public networks, while others may provide access to private networks. Some of the APs 202 may be based on a 3GPP-based technology (LTE or UTRA), CDMA2000, or other cellular mobile network technology and others may be based on WI-FI.

Each AP 202 may provide a different coverage area. In FIG. 2, the coverage area for each AP is presented as a hatched circle having an AP located at its center. For example, AP 202*a* is located at the center of circle 204*a*, AP 202*b* is located at the center of circle 204*b*, and so on. It should be noted that although the coverage area for each AP 202 is represented as a circle, the size and shape of the actual coverage area will differ depending upon the antenna arrangement of the AP as well as structural interferences (e.g., buildings) or radio interference (e.g., other devices transmitting at interfering frequencies) within the coverage area.

As illustrated in the example shown in FIG. 2, UE 108 is within range of all APs 202*a*, 202*b*, 202*c*, 202*d*, 202*e* and 202*f* shown. Theoretically, UE 108 is in range of an AP 202 as long as the UE 108 is within the corresponding circle 204 of the AP 202, however, due to the discrepancies described above, that is not always the case. Additionally, UE 108 may not be authorized to connect using certain APs. For example, AP 202*a* may be a cellular service operated by a network for which UE 108 is not subscribed. AP 202*e* may connect to a private WI-FI network of an enterprise where only the employees of that enterprise have access. In addition, there may be a fee associated with using AP 202*d* or the UE 108 is not provided adequate coverage by AP 202*c*. Thus, the UE 108 needs a method of determining which of the possible APs 202 with which to connect.

First Embodiment

Figure 3:
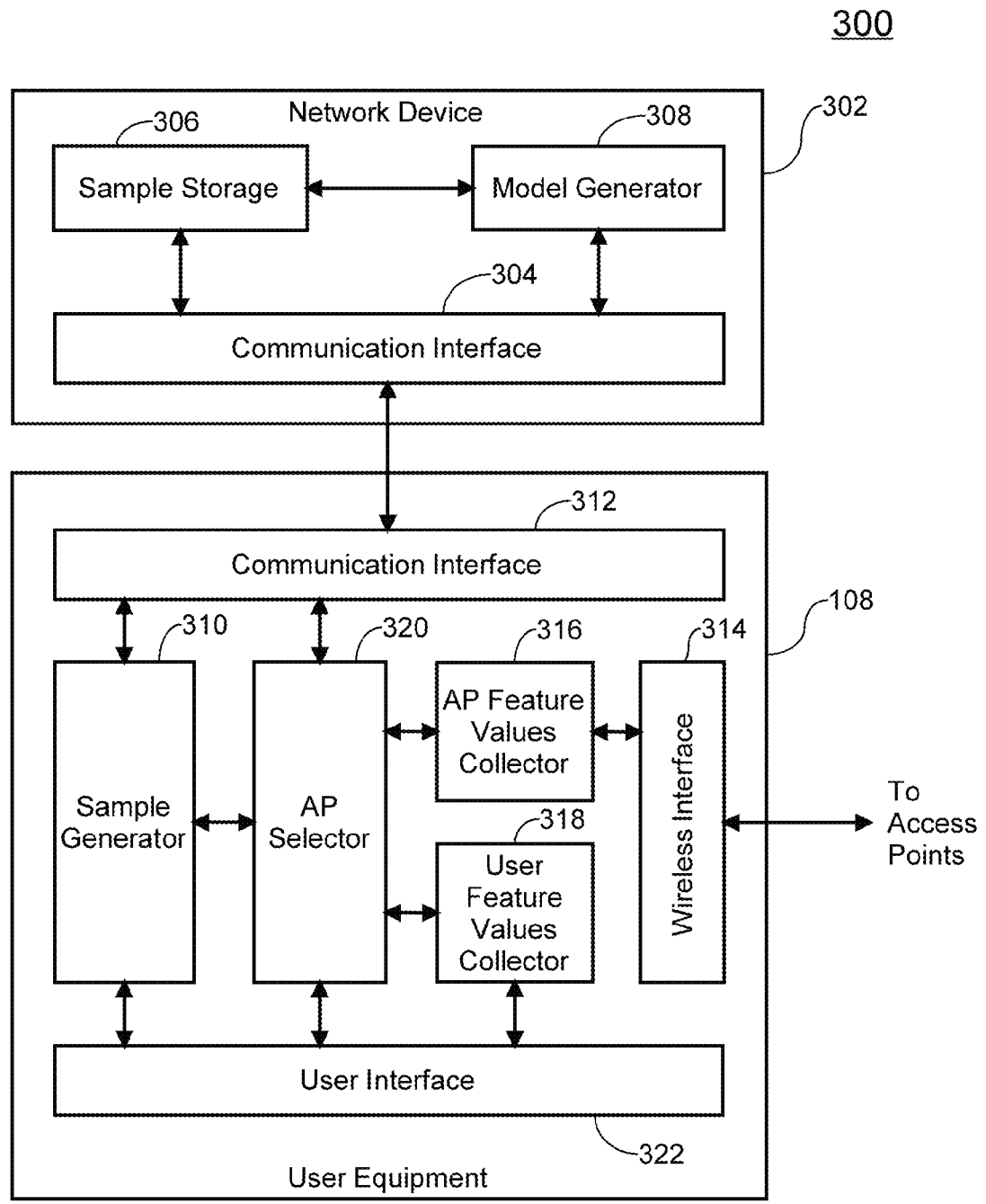
FIG. 3 is a block diagram of an example recommender system in accordance with aspects of the present disclosure.

A recommender system is described herein to solve the problem of AP selection. An example recommender system 300, comprising several parts, is illustrated in FIG. 3. The lines between the parts are intended to illustrate the main interfaces between these parts, but they are not exhaustive. In the exemplary description that follows further details are given. For instance, the "AP feature values collector" may interface a Global Positioning System (GPS) receiver, a local database, or even a remote database accessed via the Communication Module. Also, the interface between the "AP selector" and an external system that makes use of the recommender system is not shown in the figure.

One embodiment of a recommender system 300, shown in FIG. 3, comprises a network device 302 (e.g., a server, a router, a gateway, an AP, etc.) and one or more UEs 108. The network device 302 comprises a communication interface 304, a sample storage 306 and a model generator 308. The network device 302 may be physically located on one or several machines, and if hosted on multiple machines, those machines may be located within one or multiple data centers. A person skilled in the art of web service architectures will appreciate that there exist well-known techniques for distributing a service onto multiple physical and virtual hosts distributed over a smaller or larger geographical area. Therefore, the portion of FIG. 3 showing the network device 302 does not necessarily imply a single host architecture, and each module within the network device 302 may be distributed and/or replicated on multiple machines. Additionally, although shown in FIG. 3 as being located on the network device 302, either the model generator 308, the sample storage 306, or both may be located on the UE 108.

The communication interface 304 allows the network device 302 to communicate with each UE 108 over a packet network, such as the Internet.

The sample storage 306 is used to store samples generated by the sample generator 310 and used by the model generator 308. The sample storage 306 may be implemented as a database. Each sample may be a tuple of feature values and an associated user satisfaction score. The sample storage 306 may group samples by user and AP. FIG. 3 shows an embodiment where the sample storage 306 and model generator 308 are located on the network device 302, but other embodiments may place the sample storage 306 and model generator 308 on the UE 108. The latter embodiment may be particularly suitable when collaborative filtering is not applied. Yet another embodiment may have the sample storage 306 and model generator 308 distributed between the network device 302 and the UE 108. There are different methods (such as batch, mini-batch, or online) for generating and updating the models. When the sample storage 306 and the model generator 308 are distributed between the network device 302 and the UE 108, the UE 108 may perform frequent updates of the models and the network device 302 may perform periodic batch-based model updates.

The model generator 308 generates models that the UEs 108 use for selecting APs. A model may be a function that, given an ordered tuple of feature values, returns a predicted score for that tuple. The model is linear if the function is linear. A model may be viewed as a succinct representation of the samples in the sample storage 306 in the sense that the predicted scores returned by the model are "consistent" with the user satisfaction scores associated with the samples in the sample storage 306. Application of the models is described in detail below in the section entitled "Model Application."

The UE 108 comprises a communication interface 312, a wireless interface 314, an AP feature values collector 316, optionally a user feature values collector 318, an AP selector 320, a sample generator 310 and a user interface 322.

The communication interface 312 allows the UE 108 to communicate with the network device 302 over a packet network such as the Internet. The communication interface 312 may use the wireless interface 314 for communication with the network device 302 using a wireless protocol, such as WI-FI, 3GPP, LTE, etc., via an AP.

The wireless interface 314 is used by the recommender system 300 to collect information about APs within access range of the UE 108. The wireless interface 314 is used, for example, to read AP beacon frames, and to send or receive Probe requests and responses. If an AP supports GAS and/or ANQP, the wireless interface 314 is used to send WI-FI queries, such as a query for information regarding the service provider, backhaul capacity, and more. As mentioned earlier, although the recommender system 300 described here is used to recommend and select a preferred Wi-Fi AP, the recommender system 300 can be generalized to recommend and select an AP based on alternative or additional different communications technologies, in which case the system would be enhanced with wireless interfaces for each of the other communication technologies.

The AP feature values collector 316 collects and stores values for each AP feature. The AP feature values collector 316 typically collects these values for a set of APs that are within access range of the UE 108. The values of some or all of these features may be obtained through the wireless interface 314. For instance, if a feature is the received signal strength indication (RSSI), then the AP feature values collector 316 may obtain the RSSI from the wireless interface 314. Some AP features may require that the AP feature values collector 316 get measurements or other information from other sources. For instance, circumstantial features, which are described in further detail below, are treated as AP features since the AP performance or behavior may depend on them. Time of day and day of week are two of these circumstantial features, which may be derived using a system clock. Other features that may or may not be directly measurable are such that their values may be retrieved from a local database or a remote database accessed via the communication interface 312. Examples of such features are the AP coverage area and the average throughput experienced by users that have used the AP in the past. The remote database may be integrated with the network device 302 of this recommender system 300 or may be implemented as a separate service (which may or may not be deployed on the same machines making up the network device 302 of the recommender system 300). The network device 302 may also be an ANDSF server in a 3GPP operator's core network, which the UE 108 may access using the 3GPP specified protocols.

In the following, whenever the AP feature values collector 316 retrieves a value from a database without providing further details on the location of the database, it is meant to indicate either a database located on the UE 108 or a remote database. A database may be implemented using well-known database software (e.g., a Structured Query Language (SQL) based database), but depending on the size of the data and available memory and type of memory (solid state or magnetic disk), there may be alternative implementations of a database (e.g., a hash table). A person skilled in the art of computer science will appreciate that there are multiple methods for storing data. The term "database" is used herein in the wider sense to encompass any form of data storage.

There may be situations where the AP feature values collector 316 cannot access the necessary data used to determine the value of certain features. For instance, during the first time use, the UE 108 may not have downloaded necessary data into a local database and may not be connected to a network that would allow access to a remote server providing the data. This may be handled in several ways:

The AP feature values collector 316 marks that value as missing (e.g., using a null value).

The AP feature values collector 316 inserts an estimated value. The estimated value may be based on a configured average or formula that uses values from other features to derive a value as a function of those other feature values.

The user feature values collector 318 collects and stores values associated with each user feature. The user feature values collector 318 may use various sources (not shown in FIG. 3), such as a system clock to calculate time of day or day of week, a GPS receiver to determine the user's location, the UE's operating system to determine which services are in use, etc. Other sources of information may also be used.

The AP selector 320 is a receptor of one or more models generated by the model generator 308 and uses the models to determine a preferred AP. Models derived through collaborative filtering, for example, may depend on the AP. For instance, the models may have a different bias. In this case, each model may be used to calculate a predicted score for the corresponding AP, and the preferred AP may be determined by taking the AP with the highest predicted score. In other cases, the same model may apply to multiple APs. Since the UE 108 may not be connected with the network device 302 at the time the AP selector 320 is to determine a preferred AP, the models, when not generated by the UE 108, may be pre-fetched when the UE 108 is connected to the network device 302 and stored locally in the UE 108. The AP selector 320 may apply the model to the AP feature values collected for each AP within a reachable neighborhood of the UE 108 to determine a predicted score for each AP and select the AP with the highest predicted score.

To address the case where the value of some feature is missing (see the description of the AP feature values collector 316 above) the AP selector 320 may omit the corresponding term from the model for all APs for which it calculates a predicted score. Alternatively, the AP selector 320 may apply a model that does not include the feature to all the APs. To support this latter case, the model generator 308 may generate several models with different sets of features. For instance, if a feature is known to be such that its value may not be available at the time that the AP selector 320 performs a selection, the model generator 308 may generate two or more models, some of which may include the feature and others may not include the feature. In the case where the models are AP specific, such as in the case of collaborative filtering, the model generator 308 may generate two or more sets of models where some sets may include the feature and other sets may not include the feature. The AP selector 320 should be consistent in applying these models to the APs, i.e., the AP selector 320 should apply the same model, or models from the same set, to all the APs. If several APs have almost equal predicted scores, the AP selector 320 may present the choices to the user through the user interface 322.

A recommender system 300 may be complemented by other AP selection systems. For instance, a UE 108 may be delivered pre-configured with AP selection software installed by a 3GPP network operator. That software may include selection criteria configured on the UE's Subscriber Identity Module (SIM) card or through ANDSF MOs. That software may constrain the set of possible choices, e.g., the software may restrict the user from selecting an AP that is not owned by the operator or a preferred roaming partner. In this case, the AP selector 320 may select an AP from the set of APs that pass the operator's selection criteria. The AP selector 320 may apply the model to the APs before the set of APs is constrained by the operator's software and then select the AP with the highest predicted score among those that are consistent with the operator's selection criteria. Alternatively, the AP selector 320 may apply the model after the set of APs that pass the operator's selection criteria has been determined and then select the AP with the highest predicted score from that set. A third alternative is to treat the operator's selection policies as additional features. In this case, the model generator 308 may derive weights for these features such that the AP selection based on predicted score is consistent with the operator's policies.

A similar approach may be used if the operator has implemented any form of access control. For instance, an AP may deny access to all UEs that do not belong to a certain access class if more than a certain usage threshold has been exceeded (e.g., number of users, allocated resources, backhaul traffic, or other). The access class may be broadcast over an air interface. In this case, the AP selector 320 may compute a predicted score only for those APs that the UE 108 may access, or may compute a predicted score for all the APs that are within range, or potentially within range, and select the AP that the UE 108 has access to that has the highest predicted score. Or, the recommender system 300 may treat the access class as an AP feature and let the AP feature values collector 316 assign a value to this feature according to whether the UE 108 belongs to the access class broadcast by the AP.

The sample generator 310 evaluates the user's satisfaction with a selected AP. The evaluation may be performed after communication through the selected AP has terminated, while the communication is ongoing or before the UE 108 associates with the selected AP, e.g., if the user rejects the recommendation. The sample generator 310 may use various sources of input to perform this evaluation, e.g., use the user's preference settings that user has entered via the user interface, "thumbs up" or "thumbs down" indications from the user entered via the user interface, or other sources. The user satisfaction evaluation may result in a user satisfaction score for the selected AP. The sample generator 310 generates a sample, which may be a tuple of the feature values together with the user satisfaction score.

It should be noted that the list of features provided above is not exhaustive nor is every feature necessarily required in order to build a recommender system. Also, it is not required that all recommender systems 300 have both AP and user features. For instance, a recommender system 300 may be based on AP features alone.

AP Selection

Figure 4:
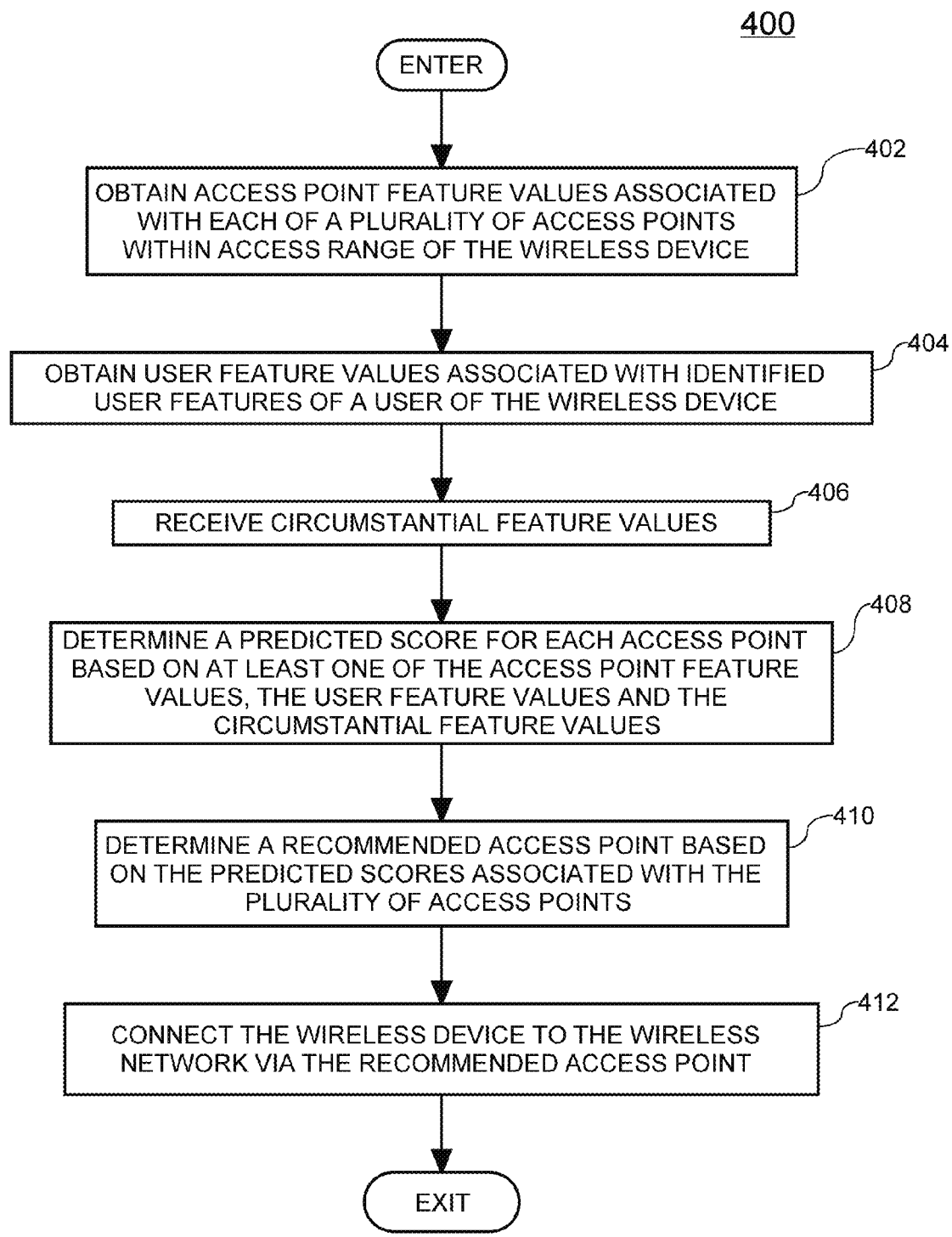
FIG. 4 is a flowchart illustrating an example method for a wireless device to select an AP and connect to a wireless network through the selected AP according to aspects of the present disclosure.

Turning now to FIG. 4, a flowchart 400 is provided which illustrates an example method for a wireless device (i.e. a UE) to select an AP 202 and connect to a wireless network through the selected AP 202 according to one embodiment of the present disclosure. The AP selection procedure may be performed on power up, when the user, through the UE's 108 user interface 322, indicates that a data connection is desired or that access to particular services is desired. The AP selection procedure may also be periodically performed after the UE 108 is communicatively connected (i.e. "attached") to an AP 202, in case the UE 108 is in coverage of another AP that presents a significantly better option for the user. It should be noted that the steps illustrated in flowchart 400 may occur in parallel or in a different order.

The AP feature values collector 316 obtains (at step 402) AP feature values associated with each AP 202 of a plurality of APs within access range of the UE 108. The AP feature values collector 316 may obtain these AP feature values in a variety of manners, including but not limited to, directly or indirectly measuring the AP feature value (e.g., RSSI measurement), retrieving the AP feature value from a local or remote database and receiving the AP feature value from an external network device. The AP feature values are passed to the AP selector 320.

Potential AP feature values may include, but are not limited to, an AP characteristic value, a scheduling value, and a payment value. AP characteristic values may include, but are not limited to, AP distance, AP distance differential, AP environment, coverage area radius, services offered, throughput, backhaul bandwidth, air interface channel utilization, round trip delay, packet data network reachability, direct internet access, local area network access, 3GPP trusted, security, mobility support, closed subscriber group, signal strength, noise and interference, air interface technology and operator policies. Scheduling values may include a time of day value and a day of week value. Payment values reflect whether an AP 202 requires a usage fee and whether the AP 202 accepts payment through a variety of payment methods. Potential AP features are described in more detail below in the section entitled "Potential AP Features."

The user feature values collector 318 obtains (at step 404) user feature values associated with identified user features of the user of the wireless device. Potential user features, which are discussed in detail below in the section entitled "Potential User Features," include wireless device location, wireless device velocity, services in use, time of day and day of week.

Optionally, the AP feature values collector 316 and/or the user feature values collector 318 may obtain (at step 406) circumstantial feature values. Circumstantial features are features that may be related to neither an AP nor the user, yet may affect the network selection. Examples of circumstantial features are the time of day, day of week, and road conditions. These features may be treated as neither an AP feature nor a user feature, or both, depending upon the circumstances. Specific usage of circumstantial features is discussed in further detail below in the section entitled "Circumstantial Features."

The AP selector 320 determines (at step 408) a predicted score for each AP within access range of the wireless device based on one or a combination of feature values, including the AP feature values, the user feature values and the circumstantial feature values. The predicted score may be determined by applying a model to the AP feature values, the user feature values, the circumstantial feature values, or any combination thereof. Alternatively, the predicted score may be determined by entering the AP feature values, the user feature values, the circumstantial feature values, or any combination thereof, into an algorithm that applies weighting factors to each combination of features. Details of specific model applications are detailed below in the section entitled "Model Application."

The AP selector 320 determines (at step 410) a recommended AP based on the predicted scores associated with each AP of the plurality of APs within access range of the wireless device. The wireless interface 314 communicatively connects (at step 412) the wireless device to the wireless network via the recommended AP.

Potential AP Features

The AP distance feature indicates the distance from the UE 108 to the AP 202. The AP feature values collector 316 may assess the location of an AP 202 by using the wireless interface 314 to acquire the AP basic service set identification (BSSID), service set identification (SSID) or homogeneous extended service set identification (HESSID) and using the BSSID, SSID, or HESSID to look up the AP 202 location in a database. Alternatively, the AP feature values collector 316 may use the UE's 108 location to look up the location of APs 202 in its neighborhood from a database. The UE's 108 location may be obtained using a GPS receiver or through another network that the UE 108 is attached to, such as a 3GPP network. The network device 302 or another system may provide the database data as an additional service. A possible way that the network device 302 may obtain the AP location data is by letting the UEs 108 report the AP BSSIDs of APs 202 within range, the received signal strength indication (RSSI) together with the UE's 108 location. By using such reports received by one or multiple UEs 108, the network device can estimate the location of the AP 202. By fitting these measurements with a signal strength attenuation function, the point where this function reaches its maximum provides an estimate of the AP 202 location. Note that these reports enable the network device 302 to not only estimate the location of the AP 202, but also to derive a path loss model and the coverage area of the AP 202.

The AP distance feature allows the UE 108 to assess whether it is within coverage of an AP 202. Given that radio signals typically attenuate according to a log-distance path loss model, a linear model may use the value of log d, where d is the distance between AP 202 and UE 108, rather than d itself, as input. Normally, the lower the value of log d is, the better the coverage and the user experience are, so this feature is typically associated with a negative weight.

The AP distance differential feature captures how fast the distance between the user (i.e. the UE 108) and the AP 202 is increasing or decreasing. The AP selector 320 can estimate the value of this feature using, for example, a decrease or increase of RSSI. If the AP's coordinates are known to the AP selector 320, the AP Selector 320 may use input from a GPS receiver and estimate whether the user is moving toward or away from the AP 202, and how fast. An AP that the user is moving toward may present a better option than an AP that the user is moving away from.

The AP environment feature refers to whether the AP 202 is indoors or outdoors. The environment may be further categorized by a more specific location such as coffee shop, library, bookstore, commuter bus or train, at or close to home or work, etc. Using readings from a GPS receiver and an accelerometer, the AP feature values collector 316 may determine that the user must be in a vehicle. If the RSSI varies insignificantly, while the user is moving, then the UE 108 may determine that the AP 202 is in the vehicle and moving with the user. The UE 108 may also identify its location when detecting the SSID of APs for which it already knows the location, for example, by looking up the location in a database. Using this information, the AP feature values collector 316 may also estimate the location of other APs. For example, if the UE 108 detects the SSID of an AP 202 and determines that the AP 202 is located inside an indoor mall, the AP feature values collector 316 may determine (with high probability) that the locations of other APs within coverage are also located inside the mall. As described for the AP distance, the UE 108 may also look up the AP 202 in a database. The data of this database may be provided by a network device 302 such as a server. Owners of APs may advertise locations online, and a server or the UE 108 may aggregate such advertisements into a database. A home or work AP SSID or BSSID may be entered into a preference configuration file, so that the AP selector 320 can use the broadcast SSID or BSSID to identify those APs.

A user may have a preference for APs 202 in certain locations. For instance, an AP located in a coffee shop may score higher for some users than an AP at a regular street corner. Luxury lounges that provide Internet access and free drinks may be sought by some users. For a user that is about to enter a bus or a train, an AP located in the bus or train may be preferable to a stationary AP in the commuter terminal.

The coverage area radius feature generally reflects the area where the user is likely to receive adequate service. Note that this area does not need to be circular in shape; nevertheless, one can extend the meaning of radius to reflect the approximate size of the coverage area. Knowing the coverage area of an AP 202 in addition to its location may provide additional information about its relevance for certain users. If the user is moving, the larger cells that require less frequent handovers may be preferred. The coverage area may be used in combination with user features, such as the user's mobility state, to predict a score for an AP 202.

The AP feature values collector 318 may assess the coverage area radius through RSSI measurements or by looking up the value in a database. The network device 302 may provide the database data as an additional service. In an embodiment, the network device 302 may obtain the AP coverage area radius data by letting the UEs 108 report the AP SSID of APs 202 within range, along with the received signal strength indication (RSSI) and the UE's 108 location. By using such reports received by one or multiple UEs 108, the network device 302 can estimate the coverage area radius of the AP 202.

Since not all services may be accessible at every AP 202, the services offered feature provides a value that indicates availability of each one of a plurality of services. The services offered through an AP 202 may have relevance for whether an AP 202 is recommended to a user. For instance, some APs 202 may offer direct Internet connectivity, whereas others may offer connectivity to a local area network (LAN), and yet others may offer connectivity into an operator's service network. Depending on connectivity, some services may not be available. For instance, if a user wishes to print a document, the recommended AP 202 must provide connectivity to a local printer, and if a user wishes to place a phone call using his/her 3G subscription, the AP 202 must provide connectivity to the operator's voice service. The AP feature values collector 316 may obtain the values of this feature using ANQP to make a query (if the AP 202 supports this function). Alternatively, the AP feature values collector 316 may obtain this value through lookup in a database. The network device 302 may provide the database data as an additional service.

The throughput feature represents the number of bytes that the UE 108 may transmit or receive per unit of time. This feature may be separated into two features; uplink and downlink throughput. The UE 108 may measure the throughput after attaching to the AP 202 and then measuring the time it takes to upload or download a quantity of data of some minimum size. For APs 202 that the UE 108 has not recently attached to or stayed attached to sufficiently long to assess the throughput, the UE 108 may apply a value based on the throughput reported to the network device 302 by other devices. The network device 302 may compute the average of such reported throughputs. The network device 302 may compute different averages for different times of days and days of week to account for periodic variations and thereby obtain better estimates. The network device 302 may provide this data to the UEs 108 as an additional service. The AP feature values collector 316 may query a database in order to obtain the default values that the AP selector 320 is to apply. Alternatively, the AP feature values collector 316 may obtain the values of this feature using ANQP to make a query (if the AP 202 supports this function). In the absence of the above, the AP feature values collector 316 may mark this feature as missing and the AP selector 320 may apply a model that does not include this feature, or the AP feature values collector 316 may use a configurable or derived default value. The AP selector 320 in the UE 108 may periodically perform the AP selection procedure, and if the throughput is low at the current AP 202, the predicted score computed for this AP 202 may be significantly lower than the predicted score of a neighbor AP, which may be used to trigger the UE 108 to perform a handover to the other AP.

The backhaul bandwidth feature represents the total bandwidth of the backhaul. It may be separated into uplink and downlink backhaul bandwidth. For instance, some APs 202 may have a backhaul bandwidth of 3 Mbps, while others may have a bandwidth of 300 Mbps. The AP feature values collector 316 may obtain the values of this feature using ANQP to make a query (if the AP 202 supports this function). Alternatively, the AP feature values collector 316 may obtain this value through lookup in a locally stored database. The network device 302 may provide the database data as an additional service. In general, the type of services and the user's experience may be limited if the backhaul capacity is low. Higher backhaul capacity (up to a certain point) may affect the predicted score positively.

The air interface channel utilization feature represents the percentage of the channel being used for transmission by all UEs 108 attached to the AP 202. The AP feature values collector 316 may obtain the values of this feature from the beacon or use ANQP to make a query (if the AP 202 supports this function). In order to take into account differences in the air interface technologies, the percentage may be adjusted by multiplying the percentage by a technology dependent factor. For instance, a percentage that may reflect very high channel utilization in IEEE 802.11 may reflect low channel utilization in 3GPP LTE, whereas an adjusted value may reflect comparable utilization in the two technologies. In general, if the percentage of the channel that is being utilized is high, then that is an indication of congestion which may affect the user's experience negatively.

The round trip delay feature represents the time it takes from when the UE 108 transmits a packet to an entity in the network until the UE 108 receives the response. The delay may be caused by delays on the air interface, in the network beyond the AP 202 and in the entity generating the response packet. The UE 108 may measure the round trip delay after attaching to the AP 202. For APs 202 that the UE 108 has not recently attached to or stayed attached to sufficiently long to assess the round trip delay, the UE 108 may apply a default value. The default value may be based on the round trip delay reported to the network device 302 by other devices. The network device 302 may compute the average of such reported round trip delays. The network device 302 may compute different averages for different times of days and days of week to account for periodic variations and thereby obtain better estimates. The network device 302 may provide this data to the UEs 108 as an additional service, and the UEs 108 may store the data in a local database. The AP feature values collector 316 may query the locally stored database in order to obtain the default values that the AP selector 320 is to apply. Alternatively, the AP feature values collector 316 may obtain the values of this feature using ANQP to make a query (if the AP 202 supports this function). The AP selector 320 in the UE 108 may periodically perform the AP selection procedure, and if the round trip delay is high at the current AP 202, the predicted score computed for this AP 202 may be significantly lower than the predicted score of a neighbor AP, which may be used to trigger the UE 108 to perform a handover to the other AP. Although the round trip delay does not depend only on the air link, but also the network beyond the AP 202 and the entity in the network responding to a packet, long round trip delays are often due to congestion on the air interface and, therefore, reflect the quality of the AP 202. Round trip delays are important for voice, video conferencing, gaming, etc., and less important for other services. This feature together with the services activated (or likely to be activated by a user) is relevant for the AP selection.

Packet data networks (PDN) reachability feature represents whether or not the servers providing user services on a packet data network are accessible to the general public. Often these servers are accessed through a PDN gateway and access is restricted to an operator's subscribers. Some APs 202 may provide access to a PDN and some may not. The AP feature values collector 316 may obtain the values of this feature using ANQP to make a query (if the AP 202 supports this function). Alternatively, the AP feature values collector 316 may obtain this value through lookup in a locally stored database. The network device 302 may provide the database data as an additional service. A user may have a subscription with a 3GPP service provider who offers services beyond those available on the Internet. Being able to access the 3GPP service provider's PDNs is often important to the user.

The direct Internet access feature and the local area network (LAN) access feature represent, respectively, whether or not an AP 202 has direct access to the Internet or whether the AP 202 has access to a LAN. Some APs 108 may provide access to a LAN only, while other APs 202 may provide access to the Internet. Access to a LAN may offer access to a printer or to services restricted to some users only. Access to the Internet provides access to a wide range of services. The AP feature values collector 316 may obtain the values of this feature using ANQP to make a query (if the AP 202 supports this function). Alternatively, the AP feature values collector 316 may obtain this value through lookup in a locally stored database. The network device 302 may provide the database data as an additional service. Depending on the type of access, some services may not be available to the user.

The 3GPP trusted feature represents whether or not a 3GPP operator has deployed WLAN access to their networks as an addition to their 3GPP radio technology based radio access networks. These operators support encryption and authentication based on the 3GPP credentials and are referred to as trusted WLANs. Some users may have a preference for 3GPP trusted WLAN, others may not care. The AP feature values collector 316 may obtain the values of this feature using ANQP to make a query (if the AP 202 supports this function). Alternatively, the AP feature values collector 316 may obtain this value through lookup in a locally stored database. A network device 302 may provide the database data as an additional service. Some users may have a strong preference for the security, ease of use, and the "one stop shopping" aspect of a 3GPP trusted AP, whereas other users may not care.

The security feature represents the type and availability of encryption and authentication support. Some APs 202 may offer radio link layer encryption, for example, in compliance with IEEE 801.11i or authentication and encryption according to the 3GPP specifications. Other APs 202 offer no form of encryption and a very basic form of authentication or no authentication at all. Similar to the charging options, each authentication and encryption option may be represented by a binary feature. The AP feature values collector 316 may obtain the values of this feature from the beacon frame or using ANQP to make a query (if the AP 202 supports this function). Alternatively, the AP feature values collector 316 may obtain this value through lookup in a locally stored database. The network device 302 may provide the database data as an additional service. For some users, an AP 202 that does not have encrypted radio link may not be acceptable, whereas for other users it may not matter much, either because the user does not care or because the user is protected by end-to-end encryption. An AP 202 that offers automatic authentication using 3GPP subscription credential may be preferable due to ease of use.

The mobility support feature represents whether or not the AP 202 provides support for handing a session over from one AP to another AP without discontinuing the user's higher layer sessions such as a voice or video call. The AP feature values collector 316 may obtain the values of this feature using ANQP to make a query (if the AP 202 supports this function). Alternatively, the AP feature values collector 316 may obtain this value through lookup in a locally stored database. The network device 302 may provide the database data as an additional service. Users who often engage in voice call while attached to an AP 202 may a have a preference for APs that support mobility. If a user is in a voice call while moving, the user may have an even stronger preference for a target AP 202 that supports mobility. Call drops due to failed handovers may be used as a user satisfaction source when generating samples, which is explained in greater detail below in the section entitled "Sample Generation." The sample generator 310 may generate a low user satisfaction score for the source AP if the source AP did not support mobility, and/or a low user satisfaction score for the target AP if the target AP did not support mobility.

The closed subscriber group (CSG) feature(s) represents whether the AP 202 uses a CSG function which only allows access by certain users. If the AP 202 uses a CSG function, then an additional CSG feature may include whether the CSG function allows or prevents access by the user. APs 202 that are closed to the user may be eliminated from consideration before the network selection process starts. The UE 108 may maintain a list of APs 202 identified by SSID or BSSID that are closed to a group of subscribers that the user belongs to. This list may be configured by the user or by the operator (e.g., preconfigured on the UE's 108 SIM card or configured over the air). A user may have a preference for APs 202 that support a subscriber group of which he/she is a member because these APs 202 are less likely to become congested, may offer access to services that the user often uses, or may be accessed free of additional charge.

The signal strength feature represents the received signal strength of an AP 202 at the UE 108. Most wireless standards specify a method for measuring the signal strength. For example, for WI-FI, Received Signal Strength Indication (RSSI) is used as a measurement of signal strength. The AP feature values collector 316 may obtain this value from the wireless interface 314 (i.e. a WI-FI module). A strong signal is often correlated with a good channel and, consequently to better user experience, so this feature is typically associated with a positive weight. This feature may be combined with the noise and interference feature to form an alternative feature "signal to noise and interference ratio."

The noise and interference feature represent the received noise and interference of the AP 202 at the UE 108. There are well-known methods that the UE 108 may use to estimate the noise and interference. The AP feature values collector 316 may obtain this value from the wireless interface 314. A high value of this feature is correlated with a poor channel and poor user experience, so this feature is typically associated with a negative weight. This feature may be combined with the signal strength feature to form an alternative feature "signal to noise and interference ratio."

The air interface technology feature refers to the protocol standard being used, such as IEEE 802.11a, 802.11b, or 802.11n, or 3GPP LTE, LTE advanced, or UMTS, etc.

The operator policies feature represents the set of policies applied to operation of UE 108 and may describe behaviors allowed or restricted by the UE 108. The operator's network selection policies may be defined by information stored in the UE's 108 SIM card or by ANDSF MOs. The policies may constrain the set of APs that the user may select. For instance, the policies may restrict the UE 108 from attaching to an AP 202 that is not valid (i.e. an AP that is restricted by the operator's policies). APs may be grouped into categories where each category is represented by a feature. For instance, there may be a category for preferred, valid and invalid APs, and each of these three categories may be represented by a feature. The value of the corresponding feature is set to 1 if the AP belongs to the corresponding category, and is set to 0 otherwise.

Assuming that an Application Programming Interface (API) is provided to access the policies configured on the UE 108, the AP feature values collector 316 may combine information obtained over this interface with information obtained about the AP 202 (e.g., which service provider it belongs to) to derive values for the above-mentioned features. The AP feature values collector 316 may obtain the information about the AP 202 using ANQP or through lookup in a database.

Scheduling features, such as time of day and day of week, represent time intervals during which a user's usage habits or preferences may remain relatively consistent. The day may be divided into a number of intervals. For instance the day may be divided into the following five intervals: 6 AM-9 AM, 9 AM-3 PM, 3 PM-7 PM, 7 PM-10 PM, 10 PM-6 AM. Likewise, the days of the week may be divided into 2 intervals; one for Monday through Friday, and one for the weekend. There may be other ways of dividing up time as long as each interval reflects a more or less consistent usage of the AP 202. Each interval of the time of day and each interval of the day of week may be represented by one feature. The AP feature values collector 316 may obtain these values using a system clock and computing the time of day or day of week. Additionally, some networks may be congested at certain times of the day and certain days of the week. If the current time is within those time intervals when the network is congested, then the network should be avoided.

The payment features represent what type of payment is required for the use of an AP 202. The use of an AP 202 may be charged to a user for payment in different ways. For instance, there may be a credit card charge for each use, there may be some form of pre-payment, the user may have a subscription, or the use of the AP 202 is free of charge. Charging may be reflected by several features each corresponding to one form of charging or payment. For instance, features may include one for whether payment by credit card is required, one for whether a 3G subscription is required, one for whether a prepaid subscription is required, one for when free access (i.e. no charge) is offered, etc. Each of these features takes the value of "1" if the corresponding payment option or service is supported.

The AP feature values collector 316 may obtain the values of the payment feature from the 802.11 beacon messages or using ANQP to make a query (if the AP 202 supports this function). Alternatively, the AP feature values collector 316 may obtain this value through lookup in a locally stored database. The network device 302 may provide the database data as an additional service. The potential tradeoff between low cost and quality may vary from user to user. Most users may prefer to connect to an AP 202 free of charge if the service is adequate. Some users may prefer to pay a fee for better service. Some users may also have a preference for paying for the service through their monthly mobile phone subscription, rather than paying with a credit card.

Potential User Features

The recommender system 300 attempts to learn the user's preferences and recommend an AP 202 based on the user's preferences and the AP features. However, the user's preferences may vary over time, which makes the learning more difficult. The user's preferences may vary as a function of observable features of the user. For instance, if the user is using a voice call service and needs to hand over, then a handover to an AP that would allow the call to continue is preferable to a handover to an AP which would cause the call to drop. When the same user is not using a voice call service, the preference for the first AP over the second AP may be much less.

The user location may be represented by multiple features, each representing one aspect of the user's location. For instance, one feature may capture whether the user is indoors or outdoors, and another feature may capture whether the user is at (or close to) home or work. The user location may influence the user's preference for an AP. If the user is outdoors, then an outdoor AP may be preferable to an indoor AP. If the user is close to work, then the company (e.g. private or closed subscriber group (CSG)) APs inside the office building may be preferred over the public APs.

The user feature values collector 318 may assess the wireless device location using a GPS receiver or through another network that the UE 108 is attached to, such as a 3GPP network. The user's location may alternatively be assessed using the SSIDs of APs in access range and looking up their location in a local database.

The wireless device velocity may be represented by several features representing whether the UE 108 is stationary, moving at pedestrian speed, or moving at vehicular speed. The AP selector 320 may assess the user velocity using the UE's 108 GPS receiver. Alternatively, the wireless interface 314 (e.g., WI-FI module) may provide estimates based on variations of channels estimations. The wireless device speed and direction may be relevant for selecting an AP 202. For instance, if the user is moving at vehicular speed, small range APs should not be recommended.

The services-in-use feature refers to (a subset of) the applications that the user has activated and the state of these services. For instance, if the user has the web browser open in the foreground (here the service is "web browsing" and the state of the service is "in foreground"), then web browsing would be a service in use. The relevant states of a service may depend on the service. For instance, whether a voice call service is in the foreground or background may not be relevant, but whether the service is idle or not is relevant. The services-in-use feature may be represented by several features, e.g., one for each service and service state. Applications with the same communication requirements, e.g., quality of service (QoS), may be grouped together into categories. Not all services may be represented by a feature.

The services in use may influence the user's preference for an AP 202. For instance, the user may be on a voice call and it is important that the selected AP 202 can connect back to the IP Multimedia Services (IMS) network so that the call is not discontinued. If the user is streaming video, an AP 202 that provides high and stable throughput may be selected to hand over the IP flow.

The user feature values collector 318 may obtain the list of services in use through the UE's operating system or software platform (e.g., the Android application framework).

The time of day and day of week user features are very similar to the time of day and day of week AP features. The difference is that the intervals that the time of the day and the days of the week are divided into reflect different behaviors of the user rather than different AP traffic patterns. For instance, the intervals may reflect when a user is at work, commuting to or from work, at sleep, and other. The intervals may be configured by the user through a user interface 322 or determined automatically over a period of time. A user's AP preferences may vary over time according to a regular pattern. On evenings and weekends, the user may be streaming video, whereas during work hours the user may be synchronizing email, downloading documents. During work hours, the user may have a preference for APs that provide security and high bandwidth but not necessarily low latency, whereas after work hours and weekends, low latency becomes more important. During night time, the UE 108 may be running some time tolerant, low bit rate services (e.g., actively monitoring an alarm or performing some reporting from a medical device). The user feature values collector 318 may obtain this value using a system clock and computing the time of day or day of week.

Circumstantial Features

Circumstantial features may be related to both the AP and the user, or neither, yet still may affect the network selection. An example is the time of day or day of week. As seen above, this feature is treated as both an AP feature and a user feature.

Another example of a circumstantial feature is road traffic conditions. The AP feature values collector 316 may assess the road traffic conditions by comparing a vehicle's speed with the speed limit of the road that the vehicle is on. The AP feature values collector 316 may obtain the speed limit through lookup in a database. The ratio between the speed limit and the user's speed may be used as an indication of road traffic congestion. Alternatively, in some places, the traffic conditions may be offered as a web service or broadcast in a machine readable format. When users are stuck in traffic, their behavior with regards to using the UE may be affected. For instance, a user may start calling other people to let them know that he will be late or start doing business over the phone, looking up the traffic report, tuning in to a music station, etc. In that respect, the road condition may be viewed as a user feature.

Road conditions may also affect the APs 202. For example, if many people start using their UEs 108 while stuck in a traffic jam, the load on the APs may increase. Some APs may become congested before others. Which APs tend to get congested first may follow a regular pattern, which a recommender system may learn. In this respect, the road conditions may be viewed as an AP feature. Hence, a feature, although neither strictly an AP feature nor a user feature, may be treated as either or both.

To illustrate the use of circumstantial features, consider the following example:
1. When there is road traffic congestion, nearby people tend to use their devices more, thus creating more data traffic.
2. APs with low backhaul bandwidth and high air interface utilization tend to get congested.

Due to the above two observations a user may associate the feature "road traffic" with a negative weight. The feature in isolation will not allow the user to differentiate between APs since all nearby APs will be associated with the same value for that feature. However, when introducing a derived feature from the product of "backhaul bandwidth" and "road traffic" and associating a high positive weight with that derived feature, then APs with high backhaul bandwidth will be favored when there is road traffic. Similarly, when making a derived feature from the product of "air interface channel utilization" and "road traffic" and associating a negative weight with that derived feature, the APs with high air interface channel utilization will tend to be disfavored when there is road traffic.

Model Application

The AP selector 320 determines a preferred AP 202 based on the feature values obtained by the AP feature values collector 316 and the user feature values collector 318. According to one embodiment, the AP selector 320 applies a model to predict the user's satisfaction with an AP 320. The model may be downloaded from the network device 302 ahead of the AP selection procedure, while the UE 108 is connected to the network. For example, the network device 302 may push the model or model updates to the UE 108 periodically, or the UE 108 may download model or model updates periodically from the network device 302. Alternatively, the model generator 308 may be located on the UE 108 itself, in which case the AP selector 320 retrieves the model directly from the model generator 308 on the fly.

An example of a model (model A) is:

$$h_{\theta^{(j)}}(x) = (\theta^{(j)})^T x = \sum_{k=0}^{n} \theta_k^{(j)} x_k = \theta_0^{(j)} + \sum_{k=1}^{n} \theta_k^{(j)} x_k$$

Where
$x=(x_0, \ldots, x_n)^T$ is a vector where $x_k$ is the value of feature k ($x_0$ has a constant value 1 and $\theta_0^{(j)}$ is referred to as the bias);
n is the number of features (excluding the bias);
$\theta_k^{(j)}$ is a weight associated with feature k for user j; and
$h_{\theta^{(j)}}(x)$ is the predicted score.

The AP selector 320 applies the model (i.e. model A) to the collected features for each AP and selects the AP 202 that yields the highest predicted score. If the model yields predicted scores that are equal or very close for two or more APs, the AP selector 320 may offer a choice to the user via the user interface. A description of a selected subset of the feature values for two or more APs may be presented to the user and the user may then choose which AP should be selected. For example, the user may be given a choice between AP1, which has low air interface channel utilization but requires a payment by credit card, and AP2, which has high air interface channel utilization but is free of charge. The predicted scores for these two APs are close, so the user is informed about these two main differences and is asked to choose between AP1 and AP2. The AP selector 320 may similarly offer a choice to the user if one or several feature values are outside a typical range of values. The typical ranges for each feature or combinations (i.e. tuples) of features may be configurable parameters of the AP selector 320.

Alternatively, the ranges may be parameters associated with the model. For instance, the model generator 308 may derive the ranges based on the mean and standard deviation of the values received in multiple samples and set the typical range to be within n times the standard deviation of the mean, for some value of n. The operation of the model generator 308 is described in further detail below in the section entitled "Model Generation." A person skilled in the art of building recommender systems will appreciate that there exists methods for validating the performance of a recommender system. These methods may be used to determine ranges of the feature values where the recommender system's performance is good.

In the above model A, there is no discrimination between AP and user features. Since this model is linear, it may be necessary to use derived features rather than the raw features themselves. For instance, rather than using the AP distance d, the model may use log d, where d is the distance measured in meters between the AP 202 and the UE 108.

In the above model A, every feature value is a scalar. Features whose values are not scalar can be converted into a set of features with scalar values. For instance, the AP feature "services offered" may be converted to a set of features, one for each service, where each feature takes the value of 1 if the corresponding service is offered and the value of 0 otherwise. Alternatively, the services may be grouped and a feature defined for each group. The feature value is set to 1 if all services in the group are offered and 0 otherwise. An example of such a group of services is IMS services. In order to account for correlations between the multiple features, derived features may be products of the identified AP and user features. For instance, if $f_1$ is the AP feature "weekday" (Monday through Friday) and $f_2$ is the AP feature "3 PM-7 PM", then the model may contain features $x_i=f_1$, $x_{i+1}=f_2$, $x_{i+2}=f_1 f_2$.

In an alternative model (model B), the weights associated with the AP features may be a function of the user features. That is, if $\theta^{(j)}$ is a weight of an AP feature and u is a vector of all the user features, then $\theta^{(j)}=F^{(j)}(u)$.

If it is assumed that $F^{(j)}$ is linear, then $\theta^{(j)}=(\Theta^{(j)})^T u$, where $\Theta^{(j)}$ is an $n_u \times n_n$ matrix, $n_u$ is the number of user features and $n_n$ is the number of AP features. Then model B becomes:

$$h_{\Theta^{(j)}}(u, x) = \left((\Theta^{(j)})^T u\right)^T x = u^T \Theta^{(j)} x = \sum_{k_n=0}^{n_n} \sum_{k_u=0}^{n_u} \Theta^{(j)}_{k_u k_n} u_{k_u} x_{k_n}$$

Where:
$u_{k_u}$ is the value of user feature $k_u$ ($u_0$ is referred to as the user bias and has constant value 1);
$x_{k_n}$ is the value of AP feature $k_n$ ($x_0$ is referred to as the AP bias and has constant value 1);
$n_n$ is the number of AP features (excluding the bias);
$n_u$ is the number of user features (excluding the bias);
$\Theta^{(j)}_{k_u k_n}$ is a weight associated with AP feature $k_n$ and user feature for $k_u$ for user j; and
$h_{\Theta^{(j)}}(u,x)$ is the predicted score.

Note that the user features $u_{k_u}$ and AP features $x_{k_n}$ may be derived features as described above in relation to model A. This new model B has the same form as model A, but has $n_n \times n_u$ features rather than $n_u + n_n$ features, which gives model B a higher number of degrees of freedom.

Yet another model (model C) is to write $\Theta^{(j)}$ as a product $\Phi^{(j)}\Psi^{(j)}$, where $\Psi^{(j)}$ is a $n_u \times 2$ matrix and $\Psi^{(j)}$ is a $2 \times n_u$ matrix. The intuition behind this approach is that a user "Alice" may be a combination of two "base" users Alice$_1$ and Alice$_2$. Here, Alice$_1$ could be "Alice at work" and Alice$_2$ could be "Alice at play". Alice$_1$ and Alice$_2$ apply different weights to the network features. The first row of $\Psi^{(j)}$ consists of the weights that Alice$_1$ applies to the network features, and the second row of $\Psi^{(j)}$ consists of the weights that Alice$_2$ applies to the network features. The first column of $\Phi^{(j)}$ consists of the weights to apply to the user features to obtain how much of Alice is Alice$_1$, and the second column of $\Phi^{(j)}$ consists of the weights to apply to the user features to obtain how much of Alice is Alice$_2$. So, intuitively, Alice can be thought of as the sum of two partial users (i.e. Alice$_1$+ Alice$_2$), and Alice's preferences are Alice$_1$'s preferences weighed by $w_1$ plus Alice$_2$'s preferences weighed by $w_2$. Thus, model C is:

$$h_{\Phi^{(j)}\Psi^{(j)}}(u,x) = u^T \Phi^{(j)} \Psi^{(j)} x$$

Where:

u is a vector of user feature values $u_{k_u}$ for each user feature $k_u$ ($u_0$ is referred to as the user bias and has constant value 1);

x is a vector of AP feature values $x_{k_n}$ for each AP feature $k_n$ ($k_0$ is referred to as the AP bias and has constant value 1);

$n_u$ is the number of user features (excluding the user bias);

$n_u$ is the number of AP features (excluding the AP bias);

$\Phi^{(j)}$ is a $(n+1) \times 2$ matrix (including a user bias row);

$\Psi^{(j)}$ is a $2 \times (n_n+1)$ matrix (including an AP bias column); and $h_{\Phi^{(j)}\Psi^{(j)}}(u,x)$ is the predicted score.

Figure 5:
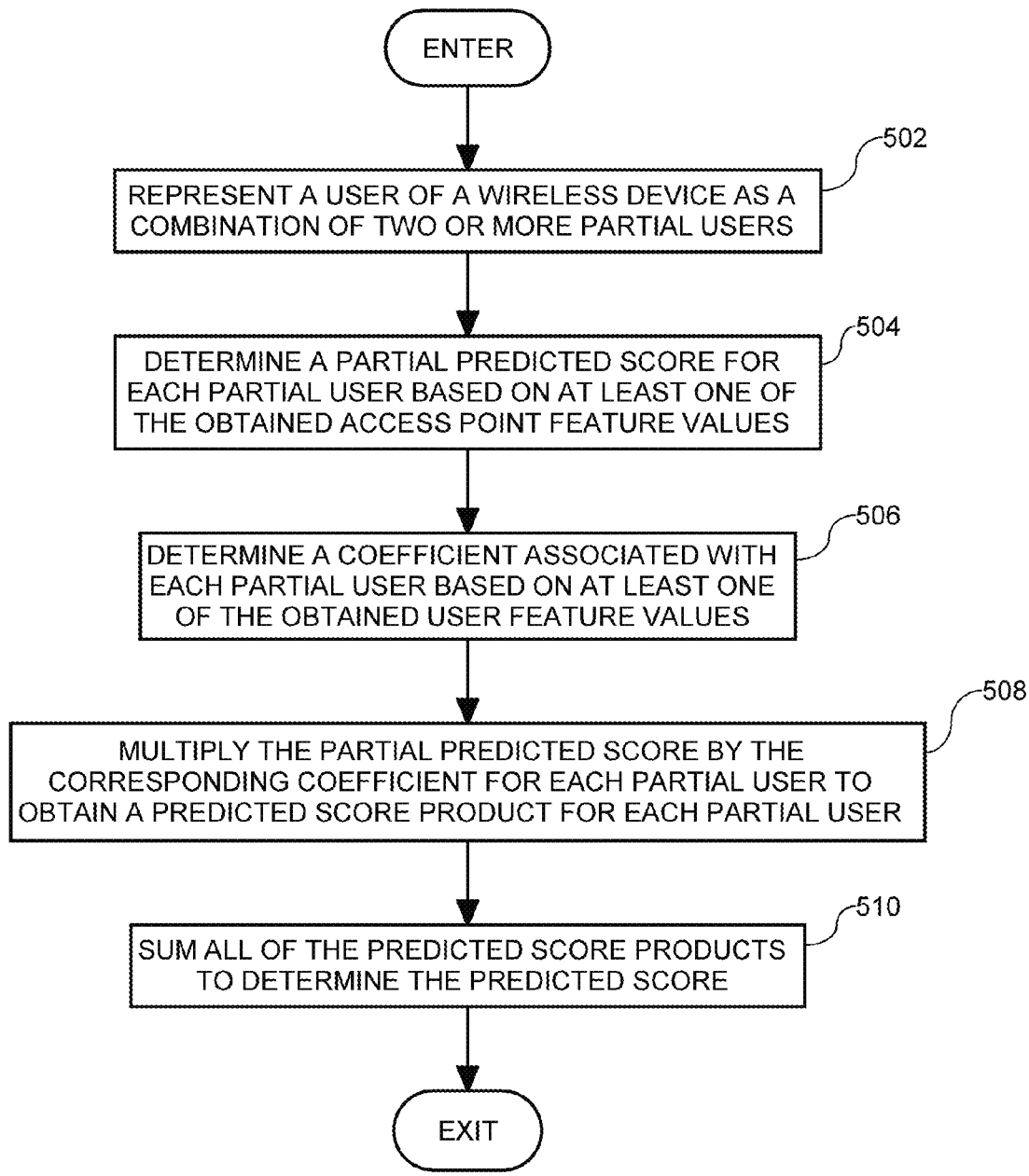
FIG. 5 is a flowchart illustrating an example method for determining a predicted score for an AP by representing the user as a combination of partial users according to aspects of the present disclosure.

Turning now to FIG. 5, a flowchart 500 is provided that illustrates an example method of determining a predicted score based on partial users, as described above in relation to model C. It should be noted that the steps of flowchart 500 imply no set order of performing the method and may occur in parallel or in a different order. The model generator 308 represents (at step 502) a user of the wireless device (i.e. the UE 108) as a combination of two or more partial users. The AP selector 320 determines (at step 504) a partial predicted score based on at least one of the obtained AP feature values, determines (at step 506) a coefficient associated with each partial user based on at least one of the obtained user feature values, multiplies (at step 508) each partial predicted score by the corresponding coefficient for each partial user to obtain a predicted score product for each partial user and sums (at step 510) all of the predicted score products to determine the predicted score.

Yet another alternative model (model D) is obtained if a sigmoid or other function is applied to the output of $u^T \Phi^{(j)}$ to get a better classification of Alice as Alice$_1$ and Alice$_2$. That is, assume $u^T \Phi^{(j)} = [-2, 1]$, i.e. Alice=Alice$_1 \times (-2)$+Alice$_2 \times 1$. By replacing the weights by the sigmoid function applied to the difference of weights (i.e. $w_1 = \sigma(w_1 - w_2)$ and $w_2 = \sigma(w_2 - w_1)$), the weight difference is made more pronounced, i.e., Alice=Alice$_1 \times 0.05$+Alice$_2 \times 0.95$.

If the two columns of $\Phi^{(j)}$ are opposites (i.e. the sum of elements in each row equals zero), then $u^T \Phi^{(j)} = [w, -w]$, and the sigmoid function may be applied directly to the elements of this vector. The model (model D) is of the form $$h_{\Phi^{(j)}\Psi^{(j)}}(u,x) = \sigma(u^T \Phi^{(j)}) \Psi^{(j)} x$$

Where:

u is a vector of user feature values $u_{k_u}$ for each user feature $k_u$ ($u_0$ is referred to as the user bias and has constant value 1);

x is a vector of AP feature values $x_{k_n}$ for each AP feature $k_n$ ($x_0$ is referred to as the AP bias and has constant value 1);

$n_u$ is the number of user features (excluding the user bias);

$n_n$ is the number of AP features (excluding the AP bias);

$\Phi^{(j)}$ is a $(n_u+1) \times 2$ matrix (including a user bias row), such that $\Phi^{(j)}_{k_u 1} = -\Phi^{(j)}_{k_u 2}$;

$\Psi^{(j)}$ is a $2 \times (n+1)$ matrix (including an AP bias column);

$\sigma$ is the sigmoid function $$\sigma(t) = \frac{1}{1+e^{-t}};$$

and $h_{\Phi^{(j)}\Psi^{(j)}}(u,x)$ is the predicted score.

Sample Generation

Figure 6:
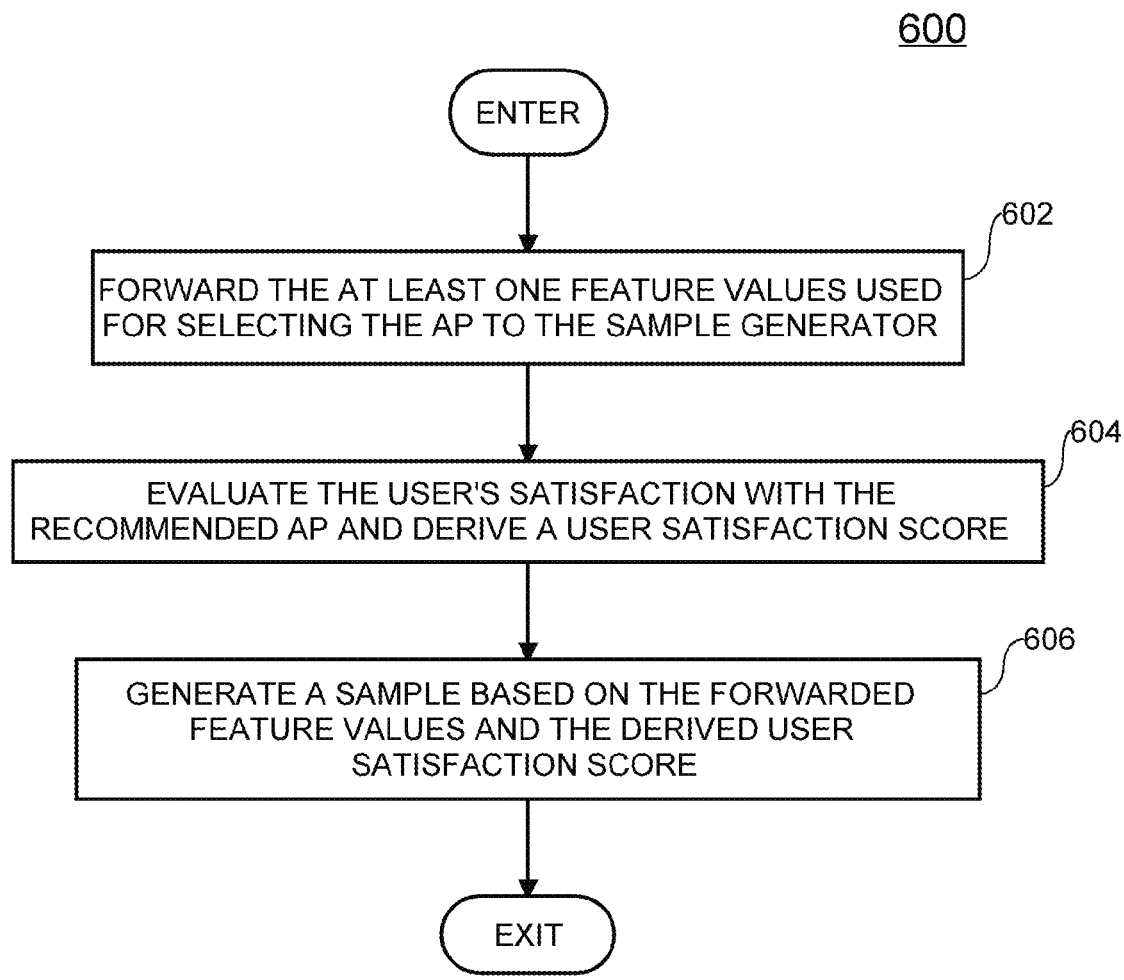
FIG. 6 is a flowchart illustrating an example method for generating samples for each AP of FIG. 2 according to aspects of the present disclosure.

Referring now to FIG. 6, a flowchart 600 illustrating a method for generating samples for each AP 202 recommended by the AP selector 320 is provided. Typically, the AP selector 320 recommends only one AP, but there may be instances where more than one AP is recommended. It should be noted that the steps of flowchart 600 imply no set order of performing the method and may occur in parallel or in a different order. All AP feature values, user feature values and circumstantial feature values used for selecting the AP 202 are forwarded (at step 602) to the sample generator 310. The transferred data may identify the user and the selected AP 202. The sample generator 310 evaluates (at step 604) the user's satisfaction with a selected AP 202. The result of the evaluation is a user satisfaction score associated with a sample and the selected AP 202. The evaluation may be performed after the user has stopped using the selected AP 202, while the usage is ongoing or before the UE 108 associates with the selected AP 202 (e.g., if the user rejects the recommendation).

The samples generator 310 evaluates the user's satisfaction using various indicators. These indicators include metrics collected at the UE 108 and user specific indicators.

Metrics collected from the UE (including the service application(s) that the user is running) may include one or more of the following:

Packet retransmissions—frequent retransmissions is an indicator of poor channel quality which often results in poor quality of experience (QoE);

Download speed—the higher the observed download speed is, the more satisfied users tend to be;

RSSI—low values indicate poor channel quality which often result in poor QoE;

Frequency of playback buffer underflows—if a user is watching a video on the UE 108, frequent and long freezes result in poor QoE; and Dropped calls/sessions—if a user is the UE for a voice or multimedia call, drops are generally indicative of poor user satisfaction.

User specific indicators may include one or more of the following:

Good match with respect to the user's preference settings—the sample generator 310 may comprise storage for the user's preferences and allow the user to set the preferences via the user interface 322. The user preference settings may include settings for price, security, 3GPP trusted WLAN versus non-trusted, preferred roaming partners, preferred APs when within range (such as the home or office AP) and more. When the AP feature values match the values in the preference setting well, then this is an indication of high user satisfaction;

The user manually selected the AP. As described above, the AP selector 320 may let the user select the AP when the model yields similar predicted scores for two or more APs. If the user previously was attached to the AP and at a later time manually selects the AP again, that may be used as an indication that the user was probably satisfied with the AP the previous time that the user selected AP (a user experience metric associated with the AP). If the sample generator 310 has the previous sample locally stored, the sample generator 310 may recalculate the associated user satisfaction score to reflect that the user has manually selected the AP;

The time the user spends at the AP—if the user reselects or requests a new recommendation from the recommender system shortly after selecting an AP, then this is an indication that the user is not satisfied with the AP selection;

The selected AP is one that the user frequently returns to. The sample generator 310 may maintain a list of APs that are most frequently used by the user. If an AP is on this list, that is an indication that the user is satisfied with the AP selection. Proper control mechanisms may be used to ensure that this does not lead to a self-feeding boosting of an AP's predicted score;

The selected AP is bookmarked. The sample generator 310 may offer a menu to the user via the user interface 322 where the user may bookmark a selected AP. The fact that the user bookmarks an AP is an indication that the user is satisfied with the AP selection; and "Thumbs up"/"Thumbs down" indication (user-indicated satisfaction indication). The sample generator 310 may offer a menu to the user via the user interface 322 where the user may indicate satisfaction or dissatisfaction with the selected AP.

The sample generator 310 generates (at step 606) a sample, consisting of the feature values (i.e. all obtained AP feature values, user feature values and circumstantial feature values) and the user satisfaction score, for the selected AP 202. Samples for each selected AP may be derived/generated in a similar manner.

Model Generation and Training

Figure 7:
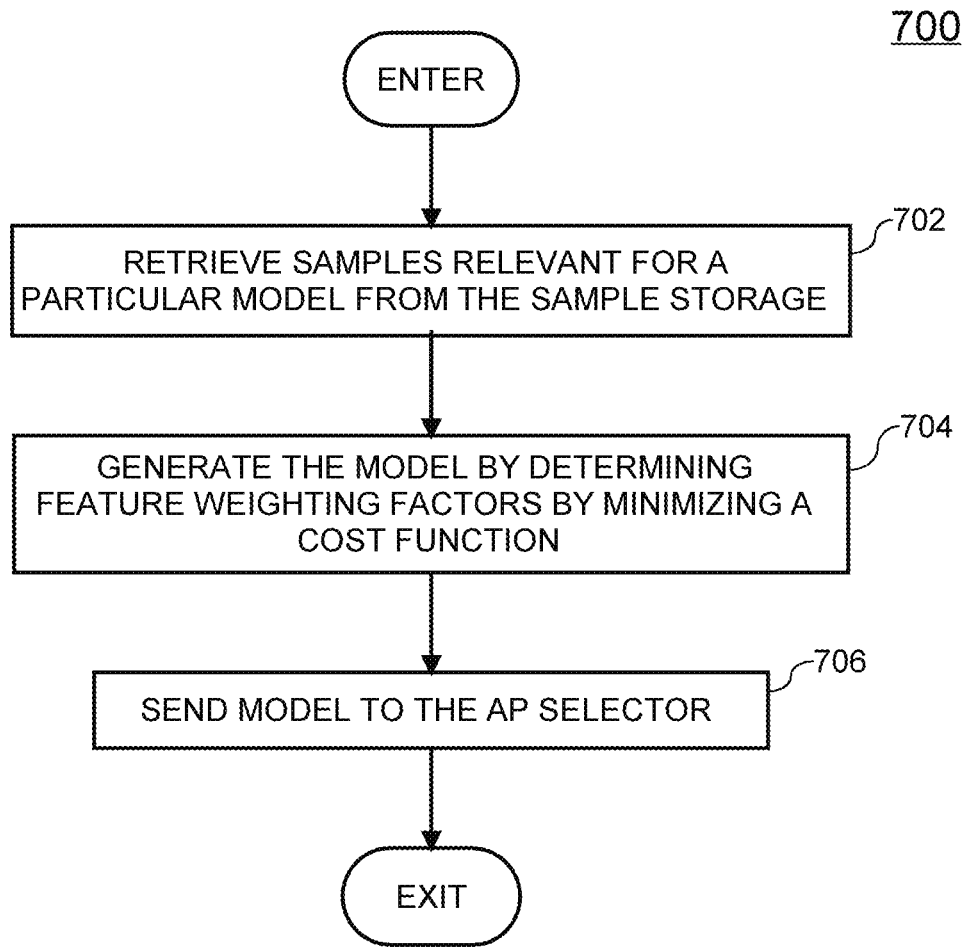
FIG. 7 is a flowchart illustrating an example method for generating a model for an AP of FIG. 2 according to aspects of the present disclosure.

A flowchart 700 illustrating an example method for generating a model and training the recommender system 300 is provided in FIG. 7. The model generator 308 retrieves (at step 702) samples relevant for a particular model type. For instance, if the model is for one particular user, only samples collected from that user may be relevant. However, a model may be based on collaborative filtering, in which case samples from a larger set of users may be used in the model generation.

The model generator 308 generates (at step 704) a model from the derived samples. The model generation may be done in "batch" mode, where all relevant samples are used in the generation of the model, in "online" mode, where the model is updated one sample at the time, or in "mini-batch" mode, where a model is updated taking into account a smaller set of samples at the time.

The model generator 308 generates (at step 704) the model by determining feature weighting factors by minimizing a cost function. The derivation of the models is referred to as training. In the section above, entitled "Model Applications," several alternative exemplary models were described. In the following section, entitled "Training Examples," description is provided for how these models may be derived. A person skilled in the art will appreciate that there exists variants of the models that have been identified above and that the methods used in deriving these models may be extended to those variants.

The model is sent (at step 706) to the AP selector 320. If the model generator 308 normalized the feature values in the derivation of the weights in the model, the weights may be adjusted to counter the effect of normalization before the model is sent to the AP selector 320, which may then apply the model to collected un-normalized feature values. The model may be transmitted as a file. The protocol may be Hyper Text Transfer Protocol (HTTP) or another suitable protocol. If the model is linear, as is the case with models A through D in the "Model Application" section above, the model is fully determined by the weights associated with each feature. The file used to transfer a model may be formatted using Extensible Markup Language (XML), JavaScript Object Notation (JSON), Abstract Syntax Notation 1 (ASN.1) or any other format. Several models may be transmitted in the same file. If two or more models differ slightly (e.g., they differ only in the bias term), each model may be encoded as a difference to a base model that is transmitted once. Appendix A below shows an example of a model file format based on XML. A person skilled in the art will appreciate that there may be other suitable encodings and network protocols for transferring a model between the network device 302 and the UE 108.

Training Examples

Case 1:
Given the form of model A from above, as follows:

$$h_{\theta^{(j)}}(x) = \sum_{k=0}^{n} \theta_k^{(j)} x_k = (\theta^{(j)})^T x$$

Where:
$x = (x_0, \ldots, x_n)^T$ is a vector such that $x_k$ is the value of feature k ($x_0$ is referred to as the bias and has constant value 1);
n is the number of features (excluding the bias);
$\theta_k^{(j)}$ is a weight associated with feature k for user j; and
$h_{\theta^{(j)}}(x)$ is the predicted score.

In this case, training consists of determining the values of the weights $\theta_k^{(j)}$. Let S be the set of all samples in the sample storage 306 and $S^{(j)}$ denote the subset of S that is the set of training set samples involving user j. Observe that S is the disjoint union of $S^{(j)}$, i.e. $S = \cup_j S^{(j)}$ and $S^{(j)} \cap S^{(j')} = \emptyset$ if $j \neq j'$.

The sample storage 306 need not contain samples for every user and every AP. Let $x^{(s)}$ be the value of x in sample s and $y^{(s)}$ be the user satisfaction score in sample s. Training consists in minimizing the cost function:

$$J(\theta) = \frac{1}{2} \sum_{s \in S} \left( (\theta^{(j)})^T x^{(s)} - y^{(s)} \right)^2 + \frac{\lambda}{2} \sum_j \sum_{k=1}^{n} \left( \theta_k^{(j)} \right)^2$$

The cost function captures how well the model fits the set of samples S. The lower the value of the cost function, the better the fit. The term in the cost function $$\frac{\lambda}{2} \sum_j \sum_{k=1}^n (\theta_k^{(j)})^2$$

is referred to as the regularization term and its purpose is to avoid so called "overfitting," which is the case in which the model fits the samples too well but does not generalize well. Note that the bias term is not regularized, i.e. k>0 in the regularization term.

The parameter λ is used to control overfitting. Note that $$J(\theta) = \sum_j J^{(j)}(\theta)$$

where $$J^{(j)}(\theta) = \frac{1}{2} \sum_{s \in S} (\theta^T x^{(s)} - y^{(s)})^2 + \frac{\lambda}{2} \sum_{k=1}^n \theta_k^2.$$

This means that the cost function can be minimized for each user separately.

The partial derivatives of $J^{(j)}(\theta)$ for k=0, . . . , n are:

$$\frac{\partial J^{(j)}(\theta)}{\partial \theta_k} = \sum_{s \in S(j)} (\theta^T x^{(s)} - y^{(s)}) x_k^{(s)} + \lambda \theta_k$$

Note: The regularization term is dropped in the expression for the partial derivative for the weight $\theta_0^{(j)}$ of the bias feature $x_0=1$.

Using the partial derivatives, one can derive the values of the weights $\theta_k^{(j)}$ that minimize the cost function. For instance, one may initialize the weights to random small values and use a method known as gradient descent to find the values for the weights that minimize the cost function. Using those weights one obtains a model for user j.

Case 2:
Given model B:

$$h_{\Theta^{(j)}}(u, x) = ((\Theta^{(j)})^T u)^T x = u^T \Theta^{(j)} x = \sum_{k_n=0}^{n_n} \sum_{k_u=0}^{n_u} \Theta_{k_u k_n}^{(j)} u_{k_u} x_{k_n}$$

Where:
 $u_{k_u}$ is the value of user feature $k_u$ ($u_0$ is referred to as the user bias and has constant value 1);
 $x_{k_n}$ is the value of AP feature $k_n$ ($x_0$ is referred to as the AP bias and has constant value 1);
 $n_n$ is the number of AP features (excluding the bias);
 $n_u$ is the number of user features (excluding the bias);
 $\Theta_{k_u k_n}^{(j)}$ is a weight associated with AP feature $k_n$ and user feature for $k_u$ for user j; and
 $h_{\Theta^{(j)}}(u,x)$ is the predicted score.

Training consists in determining the weights $\Theta_{k_u k_n}^{(j)}$. The cost function used in training the model is:

$$J(\Theta) = \frac{1}{2} \sum_{s \in S} ((u^{(s)})^T \Theta^{(j)} x^{(s)} - y^{(s)})^2 + \frac{\lambda}{2} \sum_j \sum_{k_n=0}^{n_n} \sum_{k_u=0}^{n_u} (\Theta_{k_u k_n}^{(j)})^2.$$

Again, notice that:

$$J(\Theta) = \sum_j J^{(j)}(\Theta)$$

so that the model for each user can be trained individually.
The partial derivatives are:

$$\frac{\partial J^{(j)}(\Theta)}{\partial \Theta_{k_u k_n}} = \sum_{s \in S(j)} ((u^{(s)})^T \Theta x^{(s)} - y^{(s)}) u_{k_u}^{(s)} x_{k_n}^{(s)} + \lambda \Theta_{k_u k_n}.$$

Note: The regularization term is dropped for $\Theta_{00}$, which multiplies the bias $u_0^{(s)} x_0^{(s)}=1$.

Using the partial derivatives, one can derive the values of the weights $\Theta_{k_u k_n}^{(j)}$ that minimize the cost function. Using those weights, one obtains a model for user j.

Methods may be used to avoid overfitting, such as one or more of the following:
 Increasing the λ used in the regularization term;
 Increasing the set of training samples; and
 Starting with a large value of λ, gradually decreasing its value as the set of samples received from the sample generator 310 increases.

Those skilled in the art will appreciate that there are various techniques for determining overfitting and for preventing overfitting.

Case 3:
Given model C:

$$h_{\Phi^{(j)}\Psi^{(j)}}(u,x) = u^T \Phi^{(j)} \Psi^{(j)} x$$

Where:
 u is a vector of user feature values $u_k$ for each user feature $k_u$ ($u_0$ is referred to as the user bias and has constant value 1);
 x is a vector of AP feature values $x_{k_n}$ for each AP feature $k_n$ ($k_0$ is referred to as the AP bias and has constant value 1);
 $n_u$ is the number of user features (excluding the user bias);
 $n_u$ is the number of AP features (excluding the AP bias);
 $\Phi^{(j)}$ is a (n+1)×2 matrix (including a user bias row);
 $\Psi^{(j)}$ is a 2×($n_n$+1) matrix (including an AP bias column); and
 $h_{\Phi^{(j)}\Psi^{(j)}}(u,x)$ is the predicted score.

Training consists in determining the user feature weights $\Phi_{k_u,1}^{(j)}$ and $\Phi_{k_u,2}^{(j)}$ and the AP feature weights $\Psi_{1,k_n}^{(j)}$ and $\Psi_{2,k_n}^{(j)}$ for each user j. The cost function used in training the model is:

$$J(\Phi, \Psi) = \frac{1}{2} \sum_{s \in S} ((u^{(s)})^T \Phi^{(j)} \Psi^{(j)} x^{(s)} - y^{(s)})^2$$

$$+\frac{\lambda}{2}\sum_{j}\left(\sum_{k_u=1}^{n_u}\left[(\Phi_{k_u1}^{(j)})^2+(\Phi_{k_u2}^{(j)})^2\right]+\sum_{k_u=1}^{n_n}\left[(\Psi_{1k_n}^{(j)})^2+(\Psi_{2k_n}^{(j)})^2\right]\right)$$

Again, notice that $$J(\Phi^{(j)},\Psi^{(j)})=\sum_{j}J^{(j)}(\Phi,\Psi).$$

The gradient is given by the partial derivatives:

$$\frac{\partial J^{(j)}(\Phi,\Psi)}{\partial\Phi_{k_uk}}=\sum_{s\in S^{(j)}}\left((u^{(s)})^T\Phi\Psi x^{(s)}-y^{(s)}\right)u_{k_u}^{(s)}\left(\sum_{k_n=0}^{n_n}\Psi_{kk_n}x_{k_n}^{(s)}\right)+\lambda\Phi_{k_uk}$$

$$\frac{\partial J^{(j)}(\Phi,\Psi)}{\partial\Phi_{kk_n}}=\sum_{s\in S^{(j)}}\left((u^{(s)})^T\Phi\Psi x^{(s)}-y^{(s)}\right)\left(\sum_{k_u=0}^{n_u}u_{k_u}^{(s)}\Phi_{k_uk}\right)x_{k_n}^{(s)}+\lambda\Phi_{kk_n}$$

In the above partial derivatives, the regularization term $\lambda\Phi_{k_uk}$ is dropped from the first equation when $k_u=0$ and the regularization term $\lambda\Psi_{kk_n}$ is dropped from the second equation when $k_n=0$. Using the partial derivatives, one can derive the values of user feature weights $\Phi_{k_u,1}^{(j)}$ and $\Phi_{k_u,2}^{(j)}$ and the AP feature weights $\Psi_{1,k_n}^{(j)}$ and $\Psi_{2,k_n}^{(j)}$ for each user j that minimize the cost function. Using those weights, one obtains a model for user j.

Case 4:
Given model D:

$$h_{\Phi^{(j)}\Psi^{(j)}}(u,x)=\sigma(u^T\Phi^{(j)})\Psi^{(j)}x$$

Where:
u is a vector of user feature values $u_{k_u}$ for each user feature $k_u$ ($u_0$ is referred to as the user bias and has constant value 1);
x is a vector of AP feature values $x_{k_n}$ for each AP feature $k_n$ ($x_0$ is referred to as the AP bias and has constant value 1);
$n_u$ is the number of user features (excluding the user bias);
$n_n$ is the number of AP features (excluding the AP bias);
$\Phi^{(j)}$ is a $(n_u+1)\times 2$ matrix (including a user bias row), such that $\Phi_{k_u,1}^{(j)}=-\Phi_{k_u,2}^{(j)}$;
$\Psi^{(j)}$ is a $2\times(n_n+1)$ matrix (including an AP bias column);
$\sigma$ is the sigmoid function $$\sigma(t)=\frac{1}{1+e^t};$$

and
$h_{\Phi^{(j)}\Psi^{(j)}}(u,x)$ is the predicted score.
The cost function is:

$$J(\Phi,\Psi)=\frac{1}{2}\sum_{s\in S}\left(\sigma((u^{(s)})^T\Phi)\Psi^{(j)}x^{(s)}-y^{(s)}\right)^2+R.T.$$

$$R.T.=\frac{\lambda}{2}\sum_{j}\left(\sum_{k_u=1}^{n_u}(\Phi_{k_u}^{(j)})^2+\sum_{k_u=1}^{n_n}\left[(\Psi_{1k_n}^{(j)})^2+(\Psi_{2k_n}^{(j)})^2\right]\right)$$

Again, notice that $$J(\Phi^{(j)},\Psi^{(j)})=\sum_{j}J^{(j)}(\Phi,\Psi)$$

The partial derivatives are:

$$\frac{\partial J^{(j)}(\Phi,\Psi)}{\partial\Phi_{k_u}}=$$
$$\sum_{s\in S^{(j)}}\left(\sigma((u^{(s)})^T\Phi)\Psi x^{(s)}-y^{(s)}\right)\sigma'\left(\sum_{k_u=0}^{n_u}u_{k_u}^{(s)}\Phi_{k_u}\right)u_{k_u}^{(s)}\sum_{k_n=0}^{n_n}(\Psi_{1k_n}-\Psi_{2k_n})x_{k_n}^{(s)}+$$
$$\lambda\Phi_{k_u}$$

$$\frac{\partial J^{(j)}(\Phi,\Psi)}{\partial\Psi_{kk_n}}=\sum_{s\in S^{(j)}}\left(\sigma((u^{(s)})^T\Phi)\Psi x^{(s)}-y^{(s)}\right)\sigma\left((-1)^{k+1}\sum_{k_u=0}^{n_u}u_{k_u}^{(s)}\Phi_{k_u}\right)x_{k_n}^{(s)}+$$
$$\lambda\Psi_{kk_n}$$

Where:

$$\sigma(x)=\frac{1}{1+e^{-x}},$$

and $$\sigma'(x)=\sigma(x)\sigma(-x).$$

In the above partial derivatives, the regularization term $\lambda\Phi_{k_uk}$ is dropped from the first equation when $k_u=0$ and the regularization term $\lambda\Psi_{kk_n}$ is dropped from the second equation when $k_n=0$. Using the partial derivatives, one can derive the values of user feature weights $\Phi_{k_u,1}^{(j)}$ and $\Phi_{k_u,2}^{(j)}$ and the AP feature weights $\Psi_{1,k_n}^{(j)}$ and $\Psi_{2,k_n}^{(j)}$ for each user j that minimize the cost function. Using those weights, one obtains a model for user j.

Collaborative Filtering

As shown above, models may be derived for each user separately, i.e. only samples generated by a given user are relevant for the model to be used by that user. In collaborative filtering, samples generated by other users may be used in the derivation of a model for a given user. The model generation for model A using collaborative filtering is described below. The person skilled in the art will appreciate that the method may be extended to models B through D, and beyond.

Compared to the models described above, the models used in collaborative filtering are augmented with a set of unknown features. These features do not correspond to features that the UE can observe or measure, but are introduced by the model generator 308. Hence, the sample generator 310 need not be accommodated for their presence. The AP selector 320 also need not be accommodated for their presence other than allowing for the models to be AP specific. The model generator 308 assigns values to the unknown features in such a way to minimize a cost function. Details are provided below.

A model is given for each AP i:

$$h_{\theta^{(j)}}^{(i)}(x)=\sum_{k=1}^{n}\theta_k^{(j)}x_k+\sum_{k=n+1}^{n+m}\theta_k^{(j)}x_k^{(i)}=(\theta^{(j)})^Tx^i$$

Where:
- $x = (x_0, \ldots, x_n)^T$ is a vector such that $x_k$ is the value of feature k;
- $x^{(i)} = (x_1, \ldots, x_n, x_{n+1}^{(i)}, \ldots, x_{n+m}^{(i)})^T$ is a vector where $x_k$, for k=1, n, is the feature value of feature k, and $x_k^{(i)}$, for k=n+1, ..., n+m, is a derived value for unknown feature k for AP I;
- n is the number of known features;
- m is the number of unknown features;
- $\theta_k^{(j)}$ is a weight associated with feature k for user j; and
- $h_{\theta^{(j)}}^{(i)}(x)$ is the predicted user satisfaction score of user j at AP i.

Note that, by setting $\Sigma_{k=n+1}^{n+m} \theta_k^{(j)} x_k^{(i)} = \theta_0^{(i,j)}$, the model may be written:

$$h_{\theta^{(j)}}^{(i)}(x) = \Sigma_{k=1}^{n} \theta_k^{(j)} x_k + \theta_0^{(i,j)},$$

which is the same form as shown for model A above, except that the bias term is dependent on the AP.

The cost function is:

$$J(\theta, x') = \frac{1}{2} \sum_{s \in S} \left( (\theta^{(j)})^T x^{(s)} - y^{(s)} \right)^2 + \frac{\lambda}{2} \sum_{j=1}^{n+m} (\theta^{(j)})^T \theta^{(j)} + \frac{\lambda}{2} \sum_{i=1}^{a} (x'^{(i)})^T x'^{(i)}$$

Where
- S is the set of all samples in the sample storage 306;
- $x^{(s)}$ is the vector $x^{(i)}$, where i is the AP that the sample s pertains to, with values of $x_0, \ldots, x_n$ as received in sample s;
- $y^{(s)}$ is the user satisfaction score received in sample;
- a is the number of APs referenced by the samples in S; and
- $x'^{(i)} = (x_{n+1}^{(i)}, \ldots, x_{n+m}^{(i)})^T$ is the vector of unknown feature values for AP i.

The partial derivatives of J are:

$$\frac{\partial J(\theta, x')}{\partial \theta_k^{(j)}} = \sum_{s \in S} \left( (\theta^{(j)})^T x^{(s)} - y^{(s)} \right) x_k^{(s)} + \lambda \theta_k^{(j)}$$

$$\frac{\partial J(\theta, x')}{\partial x_k^{(i)}} = \sum_{s \in S} (\theta^T x^{(s)} - y^{(s)}) \theta_k^{(s)} + \lambda x_k^{(i)}$$

In the partial derivative in the first line above, k ranges from 1 to n+m, whereas in the second line above, k ranges from n+1 to n+m. Using the partial derivatives, one can derive the values of the weights $\theta_k^{(j)}$ that that minimize the cost function. Using those weights one obtains a model for user j.

Second Embodiment

Figure 8:
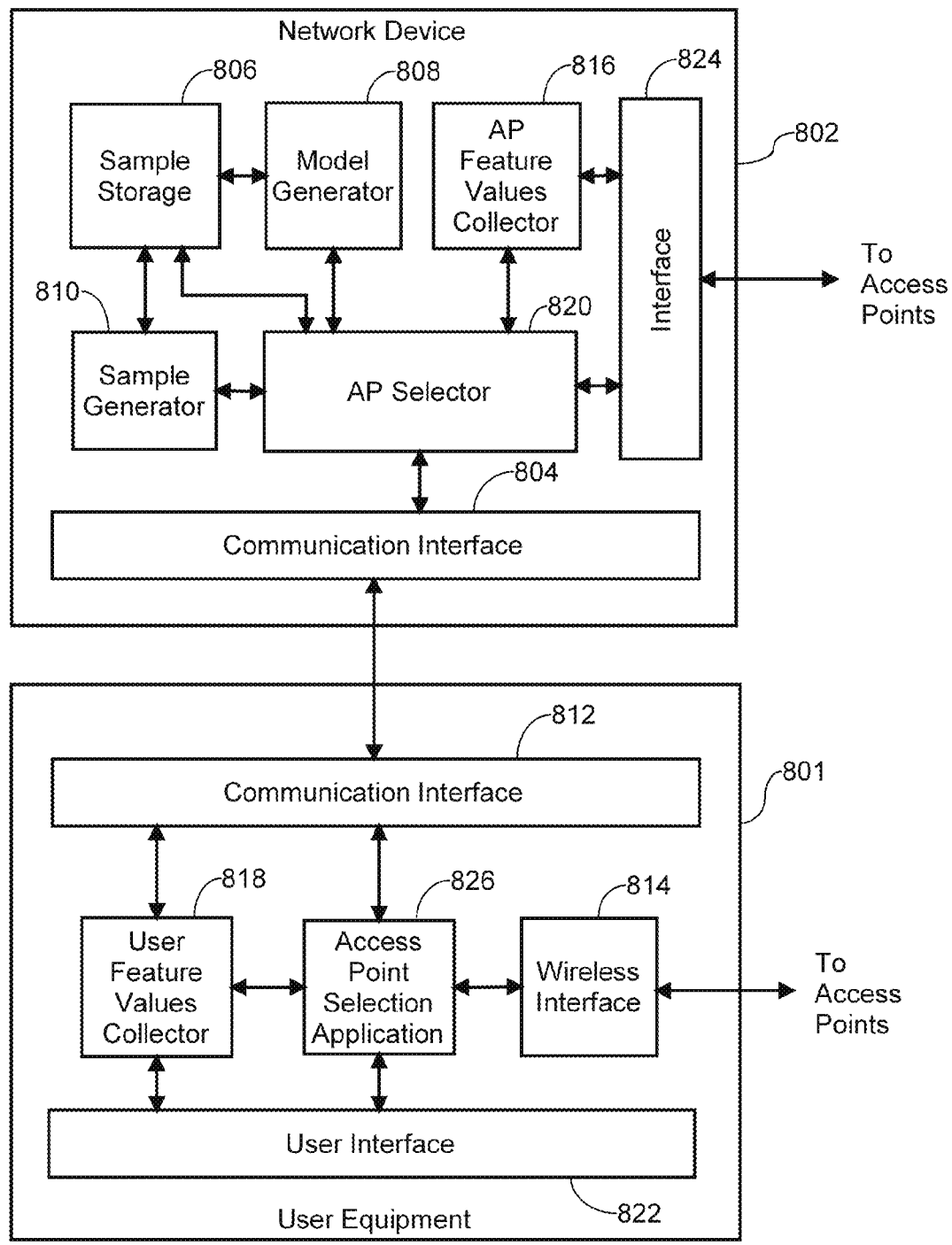
FIG. 8 is a block diagram of another example recommender system in accordance with aspects of the present disclosure.

Another embodiment of the present disclosure is illustrated in FIG. 8. Recommender system 800 is similar to recommender system 300; however, certain key components of the system have been relocated from the UE 801 to the network device 802 to reduce the processing and storage requirements for the UE 801. The network device 802 (such as a server, gateway, AP, router etc.) includes a sample storage 806, a model generator 808 and a communication interface 804 which function in the same manner as their counterpart components functioned in recommender system 300 described above. Network device 802 also includes a sample generator 810, an AP feature values collector 816 and an AP selector 820. These components function similarly to their counterpart components of recommender system 300 but for operational changes necessary to accommodate for the location change. Additionally, the network device 802 has an interface 824, such as a backhaul interface, to enable communications with APs 202 to acquire AP feature values and information needed to construct samples.

The UE 801 includes a communication interface 812 to enable communications with the network device 802 and other devices. A user feature values collector 818 obtains user feature values relating to the preferences and usage habits of the user and transfers these values to the AP selector 820 of the network device 802 via the communication interface 812. Optionally, an additional user feature values collector (not shown) may reside on the network device 802 to collect information relating to the user's preferences provided by the user via the user interface 822 or by other means.

Sample generator 810 has functions equivalent to sample generator 310. Sample generator 810 may obtain information needed to generate samples from APs 202 via interface 824 and UE 801 via communication interface 804 or interface 824. Sample generation may be triggered when sample generator 810 is notified of the availability of new sample information from UE 801 (e.g. a change in network performance, a new user satisfaction rating or score such as a 'thumbs-up'). Alternatively, sample generation may be trigger by a change in connection state or network performance as determined and communicated by APs 202.

An AP selection application 826, which runs on the UE 801 and may be provided by the service operator or a third party, controls AP selection requests. The AP selection application 826 may be user-invoked or run automatically in the background. The AP selection application 826 may request to receive an AP recommendation from the network device 802 periodically, when certain conditions are met (e.g., quality of signal is poor, a time threshold is reached for being connected to the network via an AP charging a fee, a time interval is complete or nearly complete, etc.) or when manually requested by the user. The AP selection application 826 receives the AP selection recommendation from the network device 802 via the communication interface 812 or through the currently connected AP 202 via the wireless interface 814 and may cause the UE 801 to connect to the network via the recommended AP.

Figure 9:
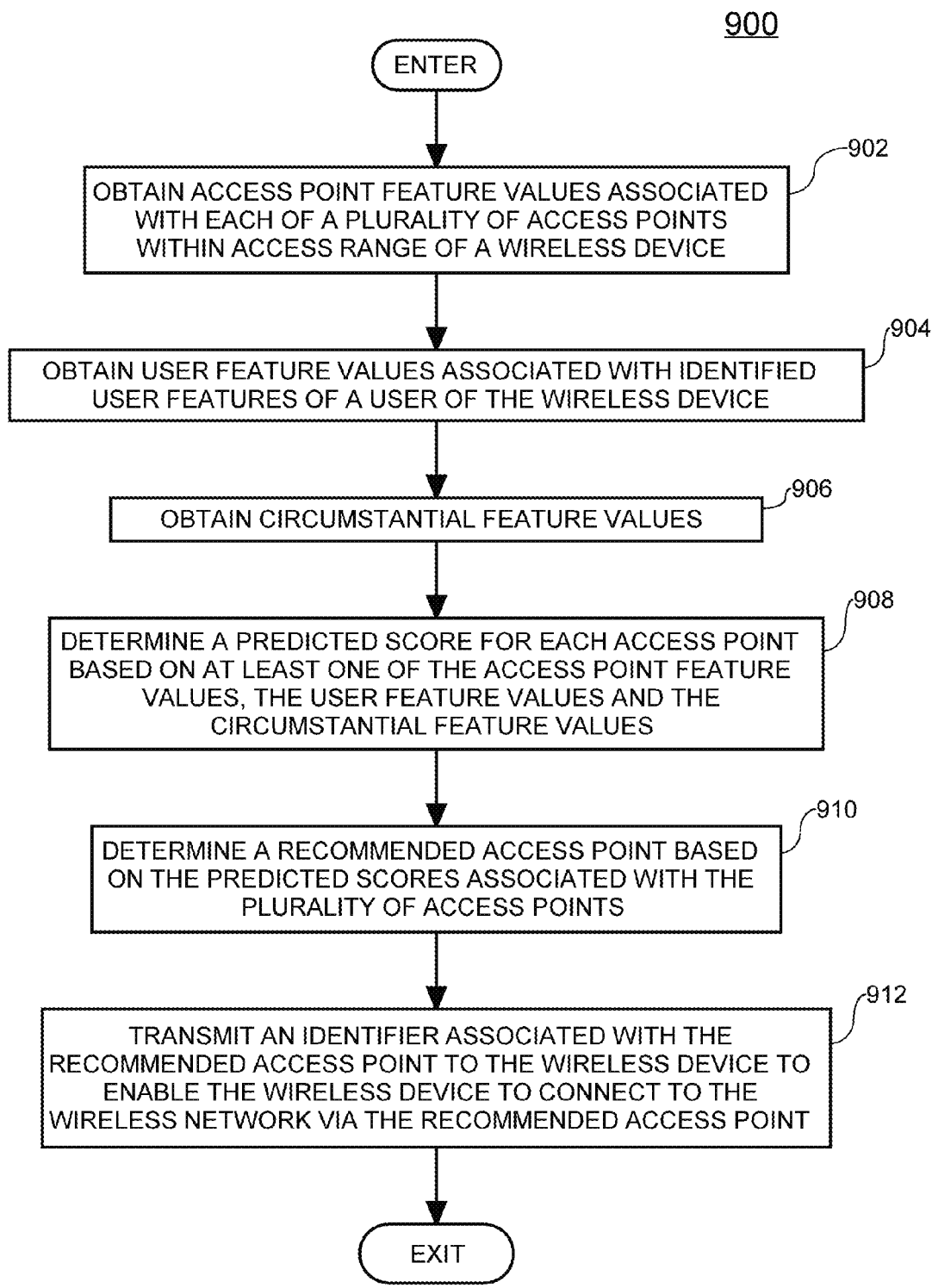
FIG. 9 is a flowchart illustrating an example method for a network device to select an AP to enable a wireless device to connect to a wireless network through the selected AP in accordance with aspects of the present disclosure.

Referring now to FIG. 9, a flowchart 900 is provided that illustrates an example method for a network device 802 to select an AP 202 to enable a wireless device 801 to connect to a wireless network through the selected AP 202. The AP feature values collector 816 obtains (at step 902) AP feature values associated with each AP 202 of a plurality of APs within access range of the wireless device 801. These AP feature values may be collected directly from each AP, retrieved from a local or remote database, or received from the UE 801 itself. The AP selector 820 obtains (at step 904) user feature values associated with identified user features for the user of the wireless device 801. These user feature values are generally received from the user feature values collector 818 of the UE 801, but may also be retrieved from a local or remote database or entered by the user via the user interface 822 of the UE 801 and received via the communication interface 804 or the wireless interface 824. Optionally, circumstantial feature values are obtained (at step 906) in a similar manner as the AP feature values and the user feature values. The AP selector 820 determines (at step 908) a predicted score for each AP based on the obtained feature values. The AP selector 820 uses the predicted scores to determine (at step 910) a recommended AP based on the predicted scores associated with the plurality of APs. Identifier(s) associated with the one or more recommended APs (e.g., an SSID, BSSID, IP address, etc.) is transmitted (at step 912) to the UE 801 via the wireless interface 824 or the communication interface 804. The AP selection application 826 uses the identifier to connect the UE 801 to the wireless network via the recommended AP. It should be noted that the steps illustrated in flowchart 900 may occur in parallel or in a different order.

Figure 10:
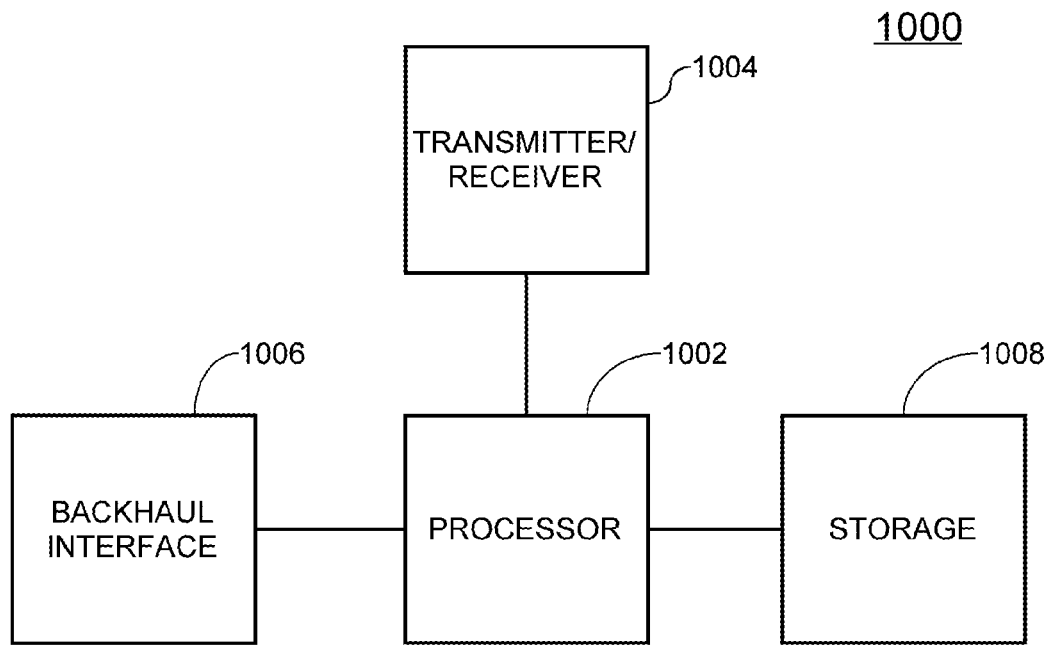
FIG. 10 is a block diagram of an example AP in accordance with aspects of the disclosure.

FIG. 10 is a functional block diagram of an access node 1000 in accordance with aspects of the invention. In various embodiments, the access node 1000 may be a mobile WiMAX base station (BS), a global system for mobile (GSM) wireless base transceiver station (BTS), a Universal Mobile Telecommunications System (UMTS) NodeB, an LTE evolved Node B (eNB or eNodeB), a cable modem head end, a WI-FI AP, or other wireline or wireless access node of various form factors. For example, the macro base station 102, the pico station 116, the enterprise femtocell 120 or the WI-FI AP 132 of FIG. 1 or the AP 202 of FIG. 2 may be provided, for example, by the access node 1000 of FIG. 10. The access node 1000 includes a processor 1002. The processor 1002 is coupled to a transmitter-receiver (transceiver) 1004, a backhaul interface 1006, and a storage 1008.

The transmitter-receiver 1004 is configured to transmit and receive communications with other devices. In many implementations, the communications are transmitted and received wirelessly. In such implementations, the access node 1000 generally includes one or more antennae for transmission and reception of radio signals. In other implementations, the communications are transmitted and received over physical connections such as wires or optical cables. The communications of the transmitter-receiver 1004 may be with terminal nodes (i.e. UE).

The backhaul interface 1006 provides communication between the access node 1000 and a core network. The communication may be over a backhaul connection, for example, the backhaul connection 106 of FIG. 1. Communications received via the transmitter-receiver 1004 may be transmitted, after processing, on the backhaul connection. Similarly, communication received from the backhaul connection may be transmitted by the transmitter-receiver 1004. Although the access node 1000 of FIG. 10 is shown with a single backhaul interface 1006, other embodiments of the access node 1000 may include multiple backhaul interfaces. Similarly, the access node 1000 may include multiple transmitter-receivers. The multiple backhaul interfaces and transmitter-receivers may operate according to different protocols or use different frequencies of operation.

The processor 1002 can process communications being received and transmitted by the access node 1000. The storage 1008 stores data for use by the processor 1002. The storage 1008 may also be used to store computer readable instructions for execution by the processor 1002. The computer readable instructions can be used by the access node 1000 for accomplishing the various functions of the access node 1000. In an embodiment, the storage 1008 or parts of the storage 1008 may be considered a non-transitory machine readable medium. For concise explanation, the access node 1000 or aspects of it are described as having certain functionality. It will be appreciated that in some aspects, this functionality is accomplished by the processor 1002 in conjunction with the storage 1008, transmitter-receiver 1004, and backhaul interface 1006. Furthermore, in addition to executing instructions, the processor 1002 may include specific purpose hardware to accomplish some functions.

Figure 11:
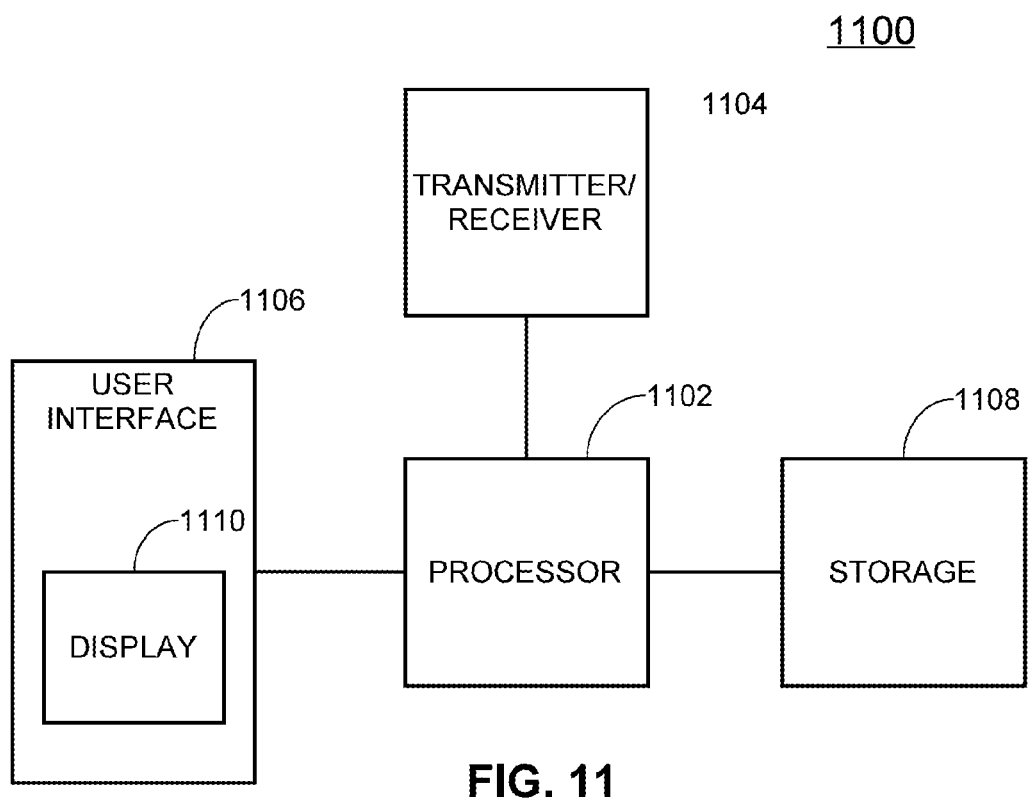
FIG. 11 is a block diagram of an example UE in accordance with aspects of the disclosure.

Referring now to FIG. 11 is a functional block diagram of a UE 1100 in accordance with aspects of the invention. The UE 1100 may be referred in different wireless technologies as a subscriber station, terminal node, mobile device, user device, mobile station (MS) or station (STA). In some embodiments, the UE 1100 may be provided by the UE 108, 801 in accordance with aspects of the present invention. The UE 1100 can be used, inter alia, for viewing streaming video. In various example embodiments, the UE 1100 may be a mobile device, for example, a smartphone or tablet or notebook computer or PDA. The UE 1100 includes a processor 1102. The processor 1102 is communicatively coupled to transmitter-receiver (transceiver) 1104, user interface 1106, and storage 1108. The processor 1102 may be a single processor, multiple processors, or a combination of one or more processors and additional logic such as application-specific integrated circuits (ASIC) or field programmable gate arrays (FPGA).

The transmitter-receiver 1104 is configured to transmit and receive communications with other devices. For example, the transmitter-receiver 1104 may communicate with a cellular or broadband base station such as an LTE evolved node B (eNodeB) or WI-FI AP. In example embodiments where the communications are wireless, the UE 1102 generally includes one or more antennae for transmission and reception of radio signals. In other example embodiments, the communications may be transmitted and received over physical connections such as wires or optical cables and the transmitter/receiver 1104 may be an Ethernet adapter or cable modem. Although the UE 1100 of FIG. 11 is shown with a single transmitter-receiver 1104, other example embodiments of the UE 1100 may include multiple transmitter-receivers. The multiple transmitter-receivers may operate according to different protocols or use different frequencies of operation.

The UE 1100, in some example embodiments, provides data to and receives data from a person (user). Accordingly, the UE 1100 includes a user interface 1106. The user interface 1106 includes functions for communicating with a person. The user interface 1106, in an exemplary embodiment, may include a display 1110 for providing visual information to the user, including displaying video content. In some example embodiments, the display 1110 may include a touch screen which may be used in place of or in combination with a keypad connected to the user interface 1106. The touch screen may allow graphical selection of inputs in addition to alphanumeric inputs.

In an alternative example embodiment, the user interface 1106 may include a computer interface, for example, a universal serial bus (USB) interface, to interface the UE 1100 to a computer. For example, a wireless modem, such as a dongle, may be connected, by a wired connection or a wireless connection, to a notebook computer via the user interface 1106. Such a combination may be considered to be a UE 1100. The user interface 1106 may have other configurations and include hardware and functionality such as speakers, microphones, vibrators, and lights.

The processor 1102 can process communications received and transmitted by the UE 1100. The processor 1102 can also process inputs from and outputs to the user interface 1106. The storage 1108 may store data for use by the processor 1102, including images or metrics derived from images. The storage 1108 may also be used to store computer readable instructions for execution by the processor 1102. The computer readable instructions can be used by the UE 1100 for accomplishing the various functions of the UE 1100. Storage 1108 can also store received content, such as video content that is received via transmitter/receiver 1104.

The storage 1108 may also be used to store photos and videos, as well as a sample generator 310, AP feature values collector 316, user feature values collector 318, 818, AP selector 320 and AP selection application 826 in accordance with aspects of the present invention. In an example embodiment, the storage 1108 or parts of the storage 1108 may be considered a non-transitory machine readable medium. In an example embodiment, storage 1108 may include one or more subscriber identity module (SIM) or machine identity module (MIM).

For concise explanation, the UE 1100 or example embodiments of it are described as having certain functionality. It will be appreciated that in some example embodiments, this functionality is accomplished by the processor 1102 in conjunction with the storage 1108, the transmitter-receiver 1104 and the user interface 1106. Furthermore, in addition to executing instructions, the processor 1102 may include specific purpose hardware to accomplish some functions.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

APPENDIX A

Example model transfer format

```
<?xml version = "1.0" encoding = "UTF-8"?>
<model
    model_type = "4"
    collaborative = "true"
    user_id = "123456"
    date = "2013-10-15"
    version = "1.0.1234"
    area_id = "12345678"
>
    <base>
        <ap_features num_features = "9">
            <feature id = "1" name = "ap distance" weight1 = "-4.3" weight2 = "-3.8" />
            <feature id = "2" name = "ap distance differential" weight1 = "2.1" weight2 = "0.0" />
            <feature id = "7" name = "backhaul bandwidth" weight = "1.5" weight2 = "3.8" />
            <feature id = "8" name = "mobility suport" weight1 = "6.0" weight2 = "0.0" />
            <!-- Each PDN is identified by a different feature id -->
            <feature id = "1083" name = "pdn reachable" weight1 = "2.1" weight2 = "0.0" />
            <feature id = "1084" name = "pdn reachable" weight1 = "3.7" weight2 = "0.0" />
            <feature id = "21" name = "3gpp trusted" weight1 = "12.3" weight2 = "0.0" />
            <!-- Derived features, which are the product of other identified features-->
            <feature id = "10016" name = "derived" weight1 = "4.2" weight2 = "0.0" >
                <component id = "1083" exponent = "1" />
                <component id = "21" exponent = "1" />
            </feature>
            <feature id = "10017" name = "derived" weight1 = "6.2" weight2 = "0.0" >
                <component id = "1084" exponent = "1" />
                <component id = "21" exponent = "1" />
            </feature>
        </ap_features>
        <user_features num_features = "8">
            <!-- Each service and service state is identified by a different feature id -->
            <feature id = "2012" name = "service_in_use" weight1 = "1.5" weight2 = "-1.5" />
            <feature id = "2017" name = "service_in_use" weight1 = "1.9" weight2 = "-1.9" />
            <feature id = "2207" name = "service_in_use" weight1 = "-1.5" weight2 = "1.5" />
            <!-- Each time of day interval state is identified by a different feature id -->
            <feature id = "1508" name = "time_of_day" weight1 = "1.0" weight2 = "-1.0" />
            <feature id = "1509" name = "time_of_day" weight1 = "1.0" weight2 = "-1.0" />
            <feature id = "1511" name = "time_of_day" weight1 = "1.0" weight2 = "-1.0" />
            <feature id = "1518" name = "time_of_day" weight1 = "-0.7" weight2 = "0.7" />
            <feature id = "1519" name = "time_of_day" weight1 = "-1.3" weight2 = "1.3" />
        </user_features>
    </base>
```

APPENDIX A-continued

Example model transfer format

```
<bias num__APs = "206">
    <ap bssid = "3c:6f:08:12:2a:43" bias1 = "10.2" bias2 = "5.6" />
    <ap bssid = "3d:7e:09:13:2b:44" bias1 = "-3.5" bias2 = "0.0" />
    <!-- 204 ap elements not shown
    ...
    -->
</bias>
</model>
```

We claim:

1. A method of determining, in a wireless device having a wireless interface, a recommended access point for the wireless device to access a wireless network, the method comprising:
    obtaining, via the wireless interface, access point feature values associated with each one of a plurality of access points within an access range of the wireless device;
    obtaining user feature values associated with identified user features of a user of the wireless device;
    calculating a predicted score for each access point of the plurality of access points by applying a model to the obtained access point feature values and the obtained user feature values, wherein the model applies a weighting factor to each of the obtained access point feature values, wherein the weighting factor is a function of the user feature values;
    determining a recommended access point of the plurality of access points based on the predicted scores associated with the plurality of access points; and
    connecting the wireless device to the wireless network based at least in part on the recommended access point.

2. The method of claim 1, wherein the access point feature values comprise at least one of: an access point characteristic value, a scheduling value, and a payment value.

3. The method of claim 2, wherein the access point characteristic value is at least one of the group comprising: an access point distance value, an access point distance differential value, an access point environment value, a coverage area radius value, a services offered value, a throughput value, a backhaul bandwidth value, an air interface channel utilization value, a round trip delay value, a packet data network reachability value, a direct internet access value, a local area network access value, a 3GPP-trusted value, a security value, a mobility support value, a closed subscriber group value, a signal strength value, a noise and interference value, a signal to noise and interference ratio value, an air interface technology value and an operator policies value.

4. The method of claim 1, wherein the identified user features are one or more of the group comprising: a wireless device location, a wireless device velocity, a services-in-use, a time of day and a day of week.

5. The method of claim 1, further comprising:
    obtaining circumstantial feature values; and
    wherein the predicted score for each access point is further based on at least one of the obtained circumstantial feature values.

6. The method of claim 1, wherein the predicted score for each access point is calculated based on a sum of products of each access point feature value multiplied by the weighting factor.

7. The method of claim 6, wherein the weighting factor is a linear function of the user feature values.

8. The method of claim 1, wherein the user of the wireless device is represented as a combination of two or more partial users, and the predicted score is determined by:
    determining a partial predicted score for each partial user based on at least one of the obtained access point feature values;
    determining a coefficient associated with each partial user based on at least one of the obtained user feature values;
    multiplying the partial predicted score by the corresponding coefficient for each partial user to obtain a predicted score product for each partial user; and
    summing all of the predicted score products to determine the predicted score.

9. The method of claim 1, wherein the model is derived using collaborative filtering.

10. The method of claim 1, wherein the model is received via the wireless interface.

11. The method of claim 1, further comprising:
    deriving a user satisfaction score associated with at least one access point of the plurality of access points;
    deriving a sample for the at least one access point of the plurality of access points based on the user satisfaction score and one or more of at least one of the obtained access point feature values and at least one of the obtained user feature values; and
    storing the sample for the at least one access point of the plurality of access points.

12. The method of claim 11, wherein the user satisfaction score is derived using at least one of: a user experience metric associated with the at least one access point, a user access point preference setting, a user manual selection and a user-indicated satisfaction indication.

13. The method of claim 12, wherein the user experience metric associated with the at least one access point is one or more of: a packet retransmissions indication, a download speed indication, a received signal strength indication, a frequency of playback buffer underflows indication, a dropped calls indication, a connection time indication, and a frequency of returns to respective access point.

14. The method of claim 12, wherein the user access point preference indication is one or more of a preferred access point identification and a bookmarked access point indication.

15. The method of claim 11, further comprising generating the model based on the derived samples corresponding to the at least one of the plurality of access points.

16. The method of claim 15, wherein the model is associated with a particular user and the model is generated based on the derived samples corresponding to the particular user.

17. The method of claim 15, wherein the model is based on collaborative filtering, and the derived samples correspond to a plurality of users.

18. The method of claim 15, further comprising normalizing all of the obtained access point feature values and the obtained user feature values.

19. The method of claim 15, further comprising training the model to determine feature weighting factors by minimizing a cost function.

20. A wireless device for determining a recommended access point to access a wireless network, the wireless device comprising:
a network interface; and
a processor, in communication with the network interface, that:
obtains, via the network interface, access point feature values associated with each one of a plurality of access points within an access range of the wireless device;
obtains user feature values associated with identified user features of a user of the wireless device;
calculates a predicted score for each access point of the plurality of access points by applying a model to the obtained access point feature values and the obtained user feature values, wherein the model applies a weighting factor to each of the obtained access point feature values, wherein the weighting factor is a function of the user feature value; and
determines a recommended access point of the plurality of access points based on the predicted scores associated with the plurality of access points; and
the network interface connects the wireless device to the wireless network based at least in part on the recommended access point.

21. The wireless device of claim 20, wherein the access point feature values comprise at least one of: an access point characteristic value, a scheduling value, and a payment value.

22. The wireless device of claim 21, wherein the access point characteristic value is at least one of the group comprising: an access point distance value, an access point distance differential value, an access point environment value, a coverage area radius value, a services offered value, a throughput value, a backhaul bandwidth value, an air interface channel utilization value, a round trip delay value, a packet data network reachability value, a direct internet access value, a local area network access value, a 3GPP-trusted value, a security value, a mobility support value, a closed subscriber group value, a signal strength value, a noise and interference value, a signal to noise and interference ratio value, an air interface technology value and an operator policies value.

23. The wireless device of claim 20, wherein the identified user features are one or more of the group comprising: a wireless device location, a wireless device velocity, a services-in-use, a time of day and a time of week.

24. The wireless device of claim 20, wherein the access point selector further obtains circumstantial feature values and wherein the predicted score for each access point is further based on at least one of the obtained circumstantial feature values.

25. The wireless device of claim 20, wherein the processor calculates the predicted score for each access point based on a sum of products of each access point feature value multiplied by the weighting factor.

26. The wireless device of claim 25, wherein the weighting factor is a linear function of the user feature values.

27. The wireless device of claim 20, wherein the user of the wireless device is represented as a combination of two or more partial users, and processor determines the predicted score by:

determining a partial predicted score for each partial user based on at least one of the obtained access point feature values;
determining a coefficient associated with each partial user based on at least one of the obtained user feature values;
multiplying the partial predicted score by the corresponding coefficient for each partial user to obtain a predicted score product for each partial user; and
summing all of the predicted score products to determine the predicted score.

28. The wireless device of claim 20, wherein the processor further derives the model using collaborative filtering.

29. The wireless device of claim 20, wherein the model is received via the wireless interface.

30. The wireless device of claim 20, further comprising a sample storage and wherein the processor further:
derives a user satisfaction score associated with at least one access point of the plurality of access points;
derives a sample for the at least one access point of the plurality of access points based on the user satisfaction score and one or more of at least one of the obtained access point feature values and at least one of the obtained user feature values; and
stores the sample for the at least one access point of the plurality of access points in the sample storage.

31. The wireless device of claim 30, wherein the processor evaluates the user satisfaction score using at least one of: a user experience metric associated with the at least one access point, a user access point preference indication, a user manual selection and a user-indicated satisfaction indication.

32. The wireless device of claim 31, wherein the user experience metric associated with the at least one access point is one or more of: a packet retransmissions indication, a download speed indication, a received signal strength indication, a frequency of playback buffer underflows indication, a dropped calls indication, a connection time indication, and a frequency of returns to respective access point.

33. The wireless device of claim 31, wherein the user access point preference indication is one or more of a preferred access point identification and a bookmarked access point indication.

34. The wireless device of claim 30, wherein the processor further generates the model based on the derived samples corresponding to the at least one of the plurality of access points.

35. The wireless device of claim 30, wherein the model is associated with a particular user and the processor generates the model based on the derived samples corresponding to the particular user.

36. The wireless device of claim 30, wherein the model is based on collaborative filtering, and the derived samples correspond to a plurality of users.

37. The wireless device of claim 34, wherein the processor further normalizes all of the obtained access point feature values and the obtained user feature values.

38. The method of claim 34, wherein the processor further trains the model to determine feature weighting factors by minimizing a cost function.

39. A computer program product for determining a recommended access point for a wireless device having a wireless interface to access a wireless network, the computer program product comprising a non-transitory computer readable storage medium having program instructions embodied therewith, the program instructions executable by the wireless device to cause the wireless device to perform a method comprising:
- obtaining, via the wireless interface, access point feature values associated with each one of a plurality of access points within an access range of the wireless device;
- obtaining user feature values associated with identified user features of a user of the wireless device;
- calculating a predicted score for each access point of the plurality of access points by applying a model to the obtained access point feature values and the obtained user feature values, wherein the model applies a weighting factor to each of the obtained access point feature values, wherein the weighting factor is a function of the user feature values;
- determining a recommended access point of the plurality of access points based on the predicted scores associated with the plurality of access points; and
- connecting the wireless device to the wireless network based at least in part on the recommended access point.

* * * * *